(12) United States Patent
Yoo et al.

(10) Patent No.: US 10,362,917 B2
(45) Date of Patent: Jul. 30, 2019

(54) CLEANING ROBOT

(71) Applicant: SAMSUNG ELECTRONICS CO., LTD., Suwon-si, Gyeonggi-do (KR)

(72) Inventors: Jeong Ki Yoo, Suwon-si (KR); Sung Jin Park, Suwon-si (KR); Jun Young Lee, Seoul (KR); Dong Min Shin, Suwon-si (KR); Dong Hun Lee, Ansan-si (KR); Jae Youl Jeong, Suwon-si (KR); Shin Kim, Hwaseong-si (KR); Heum Yong Park, Suwon-si (KR); In Hak Na, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 266 days.

(21) Appl. No.: 15/257,204

(22) Filed: Sep. 6, 2016

(65) Prior Publication Data

US 2016/0374527 A1    Dec. 29, 2016

Related U.S. Application Data

(62) Division of application No. 14/510,487, filed on Oct. 9, 2014, now Pat. No. 9,480,380.

(Continued)

(30) Foreign Application Priority Data

Dec. 4, 2013    (KR) .................. 10-2013-0149881
Aug. 12, 2014    (KR) .................. 10-2014-0104284

(51) Int. Cl.
*A47L 9/00*    (2006.01)
*G05D 1/02*    (2006.01)
*A47L 11/40*    (2006.01)

(52) U.S. Cl.
CPC ....... *A47L 11/4011* (2013.01); *A47L 11/4041* (2013.01); *A47L 11/4061* (2013.01);
(Continued)

(58) Field of Classification Search
CPC .............. A47L 11/4011; A47L 11/4072; A47L 11/4041; A47L 11/4061; A47L 11/4066;
(Continued)

(56) References Cited

U.S. PATENT DOCUMENTS

2004/0143930 A1* 7/2004 Haegermarck ......... A47L 9/009
15/358
2004/0262060 A1 12/2004 Kim
(Continued)

FOREIGN PATENT DOCUMENTS

CN    1308502    8/2001
CN    2498979    7/2002
(Continued)

OTHER PUBLICATIONS

European Search Report dated Jul. 5, 2017 in related European Application No. 14867029.2.
(Continued)

*Primary Examiner* — David Redding
(74) *Attorney, Agent, or Firm* — Staas & Halsey LLP

(57) ABSTRACT

A cleaning robot includes a main body and a drive unit to move the main body. The drive unit includes a plurality of motors to generate driving force; a plurality of wheels connected to one of the plurality of motors and rotating by driving force received from the one of the plurality of motors; and a driving frame to support the plurality of wheels, receive driving force from another motor among the plurality of motors, and rotate for changing positions of the plurality of wheels.

20 Claims, 34 Drawing Sheets

Related U.S. Application Data

(60) Provisional application No. 61/973,434, filed on Apr. 1, 2014.

(52) U.S. Cl.
CPC ....... *A47L 11/4066* (2013.01); *A47L 11/4072* (2013.01); *G05D 1/027* (2013.01); *G05D 1/0272* (2013.01); *A47L 9/009* (2013.01); *A47L 2201/04* (2013.01); *G05D 2201/0215* (2013.01)

(58) Field of Classification Search
CPC ... A47L 2201/04; A47L 9/009; G05D 1/0272; G05D 1/027; G05D 2201/0215
See application file for complete search history.

(56) References Cited

U.S. PATENT DOCUMENTS

| | | |
|---|---|---|
| 2005/0021179 A1 | 1/2005 | Kim et al. |
| 2012/0271502 A1 | 10/2012 | Lee et al. |
| 2013/0000675 A1 | 1/2013 | Hong et al. |
| 2013/0054026 A1* | 2/2013 | Jang .................. G05D 1/0227 700/258 |
| 2013/0081218 A1 | 4/2013 | Kim |
| 2013/0096717 A1 | 4/2013 | Yoon |

FOREIGN PATENT DOCUMENTS

| | | |
|---|---|---|
| CN | 1423025 | 6/2003 |
| CN | 1575721 | 2/2005 |
| CN | 201404156 | 2/2010 |
| CN | 101926631 | 12/2010 |
| EP | 2 433 541 A1 | 3/2012 |
| EP | 2 561 784 A2 | 2/2013 |
| EP | 2 561 784 A3 | 5/2013 |
| GB | 2409520 | 6/2005 |
| KR | 10-2005-0003112 | 1/2005 |
| KR | 10-2005-0063547 | 6/2005 |
| KR | 10-2010-0136885 | 12/2010 |
| KR | 10-2012-0118818 | 10/2012 |
| KR | 10-2013-0021211 | 3/2013 |
| WO | WO 2007/065034 | 6/2007 |

OTHER PUBLICATIONS

European Communication under Rule 71(3) EPC dated Sep. 12, 2018 in European Application No. 14867029.2.
Chinese Notice of Allowance dated Oct. 29, 2018 in Chinese Patent Application No. 201480066302.7.
Chinese Office Action dated Apr. 23, 2018 in Chinese Patent Application No. 201480066302.7.
International Search Report dated Mar. 18, 2015 in corresponding international patent application No. PCT/KR2014/011842.
U.S. Restriction Requirement dated Dec. 10, 2015 from U.S. Appl. No. 14/510,487.
U.S. Office Action dated Jan. 29, 2016 from U.S. Appl. No. 14/510,487.
U.S. Notice of Allowance dated Jun. 6, 2016 from U.S. Appl. No. 14/510,487.
Australian Office Action dated Mar. 23, 2017 from Australian Patent Application No. 2014357957.
Australian Office Action dated Jun. 2, 2017 from Australian Patent Application No. 2014357957.
U.S. Appl. No. 14/510,487, filed Oct. 9, 2014, Jeong Ki Yoo et al., Samsung Electronics Co., Ltd.

* cited by examiner

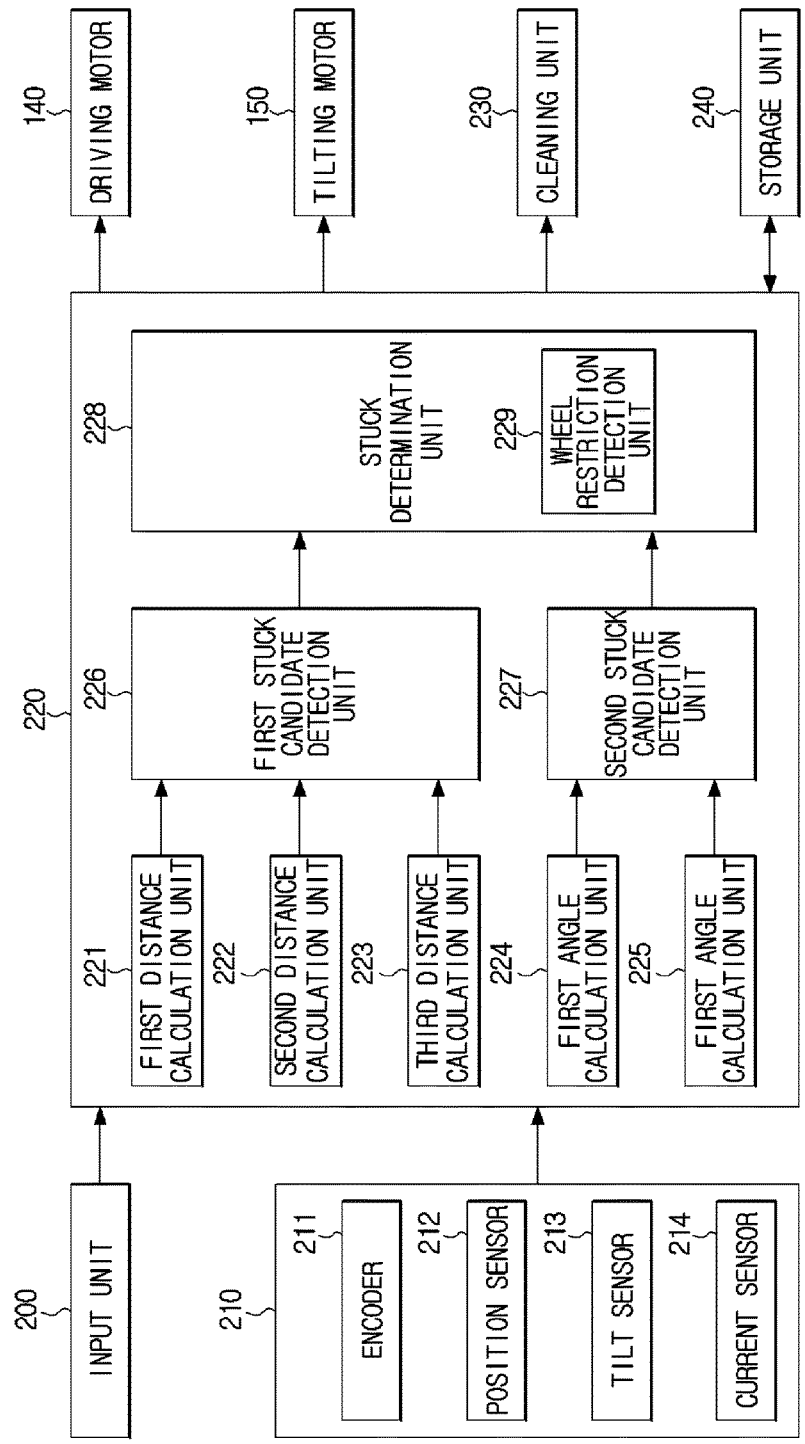

FIG. 25
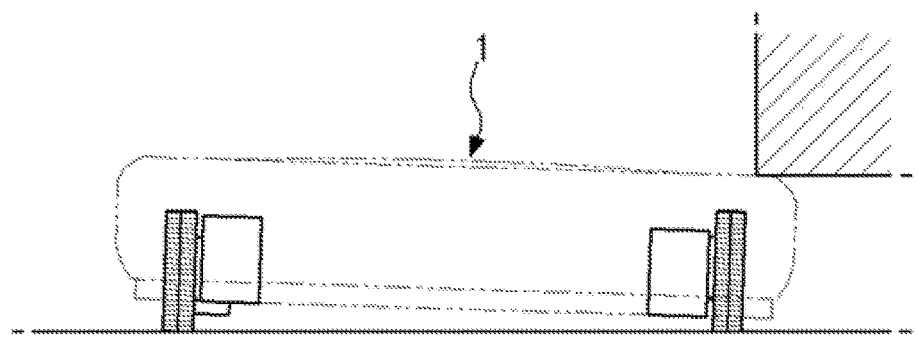
(a)
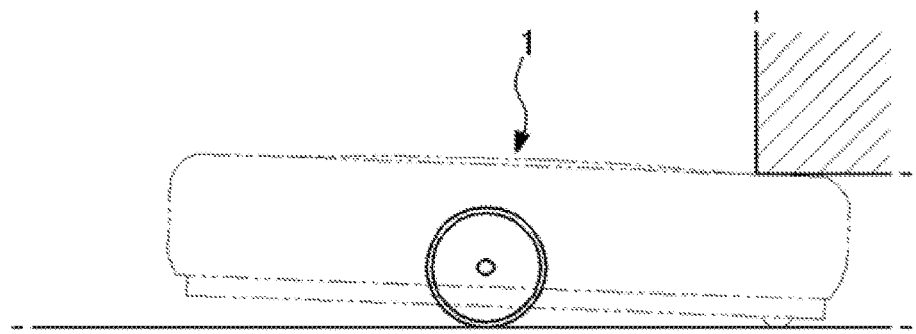
(b)

FIG. 26
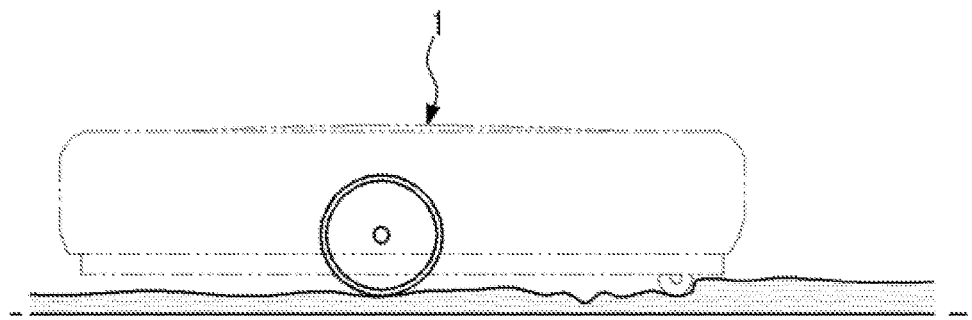
(a)
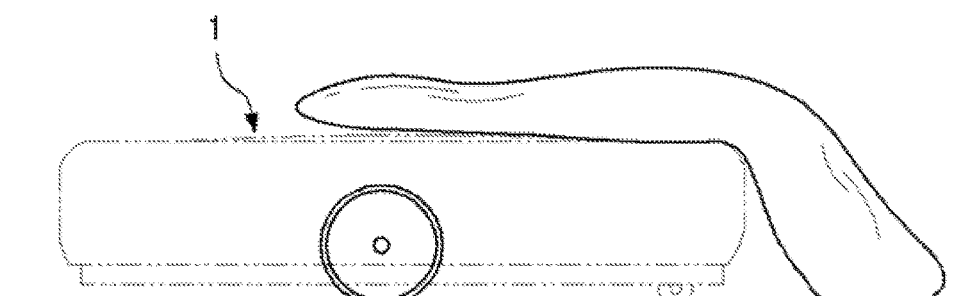
(b)

CLEANING ROBOT

CROSS-REFERENCE TO RELATED APPLICATIONS

This application is a divisional of U.S. application Ser. No. 14/510,487, filed on Oct. 9, 2014, which claims the benefit of U.S. Provisional Patent Application No. 61/973,434, filed on Apr. 1, 2014 in the USPTO, and of Korean Patent Applications No. 10-2013-0149881, filed on Dec. 4, 2013, and No. 10-2014-0104284, filed on Aug. 12, 2014 in the Korean Intellectual Property Office, the disclosures of which are incorporated herein by reference.

BACKGROUND

1. Field

Embodiments of the present disclosure relate to a cleaning robot having improved traveling performance and a method of controlling the same.

2. Description of the Related Art

In general, a cleaning robot is an apparatus which sucks up foreign substances such as dust, from a floor surface to clean a region to be cleaned while autonomously traveling about the region to be cleaned without manipulation of a user.

A cleaning robot is provided with a pair of driving wheels for traveling at both lower sides of a main body and at least one caster to support the main body to allow the main body of the cleaning robot to move forward, move backward, or rotate in a region to be cleaned. In the region to be cleaned where the cleaning robot travels, obstacles such as a step (door threshold), an object having an inclined surface, a piece of furniture, and the like may be present.

A robot including a main body with a low height such as a cleaning robot may enter a narrow space of an obstacle (e.g., space under a bed or sofa) so that an upper portion of the cleaning robot is jammed (hereinafter, referred to as 'jammed state'), or a bottom surface of the cleaning robot may be caught by a structure or groove formed on the floor or the cleaning robot may climb on an obstacle so that driving wheels of the cleaning robot are lifted up (hereinafter, referred to as 'lifted state'). Thus, the cleaning robot is often brought into a traveling-impossible state (hereinafter, referred to as 'stuck state'). Besides, the cleaning robot may get stuck in a soft object such as bedclothes or clothes to be washed so that the cleaning robot is caught by an object (hereinafter, referred to as 'object-caught state'), thereby causing a stuck state.

In conventional cleaning robots, a sensor to sense such 'jammed state', 'lifted state', or 'object-caught state' is not installed or an idling wheel is protruded by applying a suspension using a spring only when one wheel contacts the floor in the 'lifted state'.

However, since conventional cleaning robots rely on force of springs, sufficient contact force may not be obtained when a wheel is lifted and it is difficult to escape from an obstacle even after the wheel contacts the floor. Since a wheel perpendicularly protrudes, it is impossible to escape from a jammed state of a side portion. In addition, conventional cleaning robots cannot escape from a jammed state of an upper portion thereof since a function of reducing a total height (length from the floor to a top portion of the main body) is not provided thereto.

Robots now under investigation may determine a stuck state by estimating a current status of the robot in real time by utilizing high-precision position estimation, image information, and the like. However, these techniques are not suitable for relatively small and low cost robots such as cleaning robots in which height, weight, and manufacturing costs are limited. In addition, a method of sensing a stuck state by using a current sensor of a wheel drive unit conventionally used in cleaning robots is not suitable for dealing with the stuck state after understanding a current situation since it cannot be applied to various situations. Since a location recognition technique via simultaneous localization and mapping (SLAM) by using a ceiling camera operates only when there are sufficient feature points on the ceiling parallel to the floor, it is not reliable when the cleaning robot is slanted in a stuck state, the cleaning robot enters a space under the furniture, or the like.

SUMMARY

Therefore, it is an aspect of the present disclosure to provide a cleaning robot capable of detecting a stuck state such as 'jammed state', 'lifted state', or 'object-caught state' by using a motion instruction or sensor information, and a method of controlling the same.

It is another aspect of the present disclosure to provide a cleaning robot having an improved wheel structure capable of escaping from a stuck state caused under various traveling conditions, and a method of controlling the same.

It is another aspect of the present disclosure to provide a cleaning robot capable of detecting that the cleaning robot is in a stuck state by using sensor information obtained from sensors suitable for small cleaning robots and robot instructions/information regarding surroundings obtained for a predetermined time period and classifying the stuck state, and a method of controlling the same.

It is another aspect of the present disclosure to provide a cleaning robot capable of predicting a degree of risk and type of a stuck state before the cleaning robot is in the stuck state and providing an escaping method suitable for the stuck state in order to deal with the stuck state in advance, and a method of controlling the same.

Additional aspects of the invention will be set forth in part in the description which follows and, in part, will be apparent from the description, or may be learned by practice of the invention.

In accordance with one aspect of the present disclosure, a cleaning robot includes a main body, a drive unit to move the main body. The drive unit includes a plurality of motors to generate driving force, a plurality of wheels connected to one of the plurality of motors and rotating by driving force received from the one of the plurality of motors, and a driving frame to support the plurality of wheels, receive driving force from another motor among the plurality of motors, and rotate for changing positions of the plurality of wheels.

The plurality of motors may include a first motor to rotate the plurality of wheels to move the main body and a second motor to rotate the driving frame to control a height of the main body.

The second motor may be installed perpendicular to the first motor to rotate the driving frame about a rotation shaft.

The cleaning robot may further include a gear unit to transmit driving force of the second motor to the driving frame. The gear unit includes a worm gear to rotate in a state of being coupled to the second motor, a tilting gear to rotate the driving frame about the rotation shaft in accordance with the rotation of the worm gear.

The driving frame may be coupled to the tilting gear, and the gear unit may further include a connection gear to transmit driving force of the second motor between the worm gear and the tilting gear.

A rotation shaft of the tilting gear may be coaxially aligned to a rotation shaft of the first motor.

The plurality of wheels may include a main wheel driven to move the main body and a sub wheel driven in a state of being installed at an inner portion than the main wheel.

The main wheel and the sub wheel may be aligned to travel in different directions.

The cleaning robot may further include a current sensor to measure current flowing through the second motor, and the current sensor may detect whether the sub wheel contacts a floor or whether the sub wheel is restricted while the driving frame rotates.

In accordance with another aspect of the present disclosure, a cleaning robot includes a main body and a drive unit to move the main body, an input unit to input a motion instruction for the cleaning robot, an encoder to measure movement of the drive unit moving in accordance with the input motion instruction, a position sensor to measure movement of the cleaning robot, a controller to determine a traveling state of the cleaning robot by using a position value acquired in accordance with the input motion instruction, a position value of the cleaning robot calculated based on measurements of the encoder, and a position value of the cleaning robot calculated based on sensor information of the position sensor. The drive unit includes a wheel assembly including a main wheel and a sub wheel and a driving frame rotatable to change a position of the wheel assembly.

The drive unit may further include a first motor and a second motor to transmit driving force, the main wheel and the sub wheel may be connected to the first motor and rotate by driving force received from the first motor, and the driving frame may rotate by driving force received from the second motor to change a position of the wheel assembly.

The encoder may be installed in the first motor to measure an amount of movement of the first motor according to the motion instruction for the cleaning robot.

The position sensor may be an optical flow sensor to measure a distance the cleaning robot has actually moved.

At least one position sensor may be installed in the main body.

The controller may drive the second motor to rotate the driving frame including the wheel assembly upon determining that the cleaning robot is in a traveling-impossible stuck state.

The cleaning robot may further include a current sensor to sense current flowing through the second motor. The controller may stop the rotating of the driving frame when a change of current flowing through the second motor is detected during the rotation of the driving frame.

The cleaning robot may further include a current sensor to sense current flowing through the second motor. The controller changes the rotation of the driving frame in the opposite direction when overcurrent is detected in the second motor.

The cleaning robot may further include a tilt sensor to measure an inclination of the cleaning robot, and the controller calculates an angle the cleaning robot has moved based on measurements of the encoder, measures an angle the cleaning robot has moved based on sensor information of the tilt sensor, and determines a traveling state of the cleaning robot by using the calculated angle of the cleaning robot and the measured angle of the cleaning robot.

The tilt sensor may be a gyro sensor to measure an angle the cleaning robot has actually moved.

The controller may determine whether the cleaning robot is in a traveling-impossible stuck state by detecting a difference between the calculated position or angle of the cleaning robot and the measured position or angle of the cleaning robot for a predetermined time period.

In accordance with a further aspect of the present disclosure, a method of controlling a cleaning robot includes a main body; and a drive unit including a wheel assembly including a main wheel and a sub wheel and a driving frame supporting the wheel assembly and rotatable to change a position of the wheel assembly includes calculating a position or angle the cleaning robot has moved by measuring movement of the drive unit moving in accordance with the input motion instruction through an encoder, measuring movement of the cleaning robot through a sensor, and determining a traveling state of the cleaning robot by using the calculated position or angle of the cleaning robot and the measured position or angle of the cleaning robot.

The sensor may include a position sensor to measure a distance the cleaning robot has actually moved, and a tilt sensor to measure an angle the cleaning robot has actually moved.

The determining of the traveling state of the cleaning robot may be performed by determining whether the cleaning robot is in a traveling-impossible stuck state by detecting a difference between the calculated position or angle of the cleaning robot and the measured position or angle of the cleaning robot for a predetermined time period.

The driving frame may be rotated upon determination that the cleaning robot is in a traveling-impossible stuck state.

When a change of current is sensed in a motor rotating the driving frame while the driving frame rotates, the rotation of the driving frame is stopped.

When overcurrent is sensed in a motor rotating the driving frame while the driving frame rotates, the rotation of the driving frame is changed in the opposite direction.

In accordance with another aspect of the present disclosure, a cleaning robot including a main body and a drive unit to move the main body, may further include an input unit to input a motion instruction for the cleaning robot, a tilt sensor to measure an inclination of the cleaning robot moving in accordance with the input motion instruction, and a controller to determine a stuck state of the cleaning robot by using an angle value obtained by measuring an angle the cleaning robot has moved based on sensor information of the tilt sensor.

The drive unit may further include left and right driving motors to transmit driving force to left and right sides of the main body, and the cleaning robot may further include a first encoder installed in the left driving motor to measure an amount of movement of the left driving motor generated by the motion instruction for the cleaning robot, and a second encoder installed in the right driving motor to measure an amount of movement of the right driving motor generated by the motion instruction for the cleaning robot.

The tilt sensor may be a gyro sensor to measure an inclination value the cleaning robot has actually moved.

The controller may calculate an angle the cleaning robot has moved based on measurements of the first and second encoders, measure an angle the cleaning robot has moved based on sensor information of the tilt sensor, and determine a stuck state of the cleaning robot by using a difference between the calculated angle of the cleaning robot and the measured angle of the cleaning robot.

The controller may calculate first and second encoder variations A1 and A2 the cleaning robot has moved based on the measurements of the first and second encoders, calculate an inclination value variation B the cleaning robot has moved based on the sensor information of the tilt sensor, and determine a degree of risk and type of the stuck state of the cleaning robot by using the calculated first and second encoder variations A1 and A2 and the calculated inclination value variation B.

The controller may determine that the cleaning robot is in a low risk 'lifted stated' when at least one of the first and second encoder variations A1 and A2 is greater than a first encoder threshold ($A_{th1}=V+V*0.06$), and the inclination value variation B is greater than a first inclination threshold ($B_{th1}=\pm 3°$).

The controller may rapidly decelerate the driving motors to enable the cleaning robot to escape from the low risk 'lifted state' and provide information suitable for escaping from the 'lifted state'.

The controller may determine that the cleaning robot is in a low risk upper portion 'jammed stated' when at least one of the first and second encoder variations A1 and A2 is less than a first encoder threshold ($A_{th1}=V+V*0.06$), and the inclination value variation B is greater than a first inclination threshold ($B_{th1}=\pm 3°$).

The controller rapidly may decelerate the driving motors to enable the cleaning robot to escape from the low risk upper portion 'jammed state' and provide information suitable for escaping from the upper portion 'jammed state'.

The controller may determine the stuck state of the cleaning robot by detecting the difference between the calculated angle of the cleaning robot and the measured angle of the cleaning robot for a predetermined time period.

The controller may calculate first and second encoder variations $A1_{t1}$ and $A2_{t1}$ the cleaning robot has moved for a first time period t1 based on the measurements of the first and second encoders, calculate an inclination value variation B the cleaning robot has moved based on the sensor information of the tilt sensor, and determine a degree of risk and type of the stuck state of the cleaning robot by using the calculated first and second encoder variations $A1_{t1}$ and $A2_{t1}$ and the calculated inclination value variation B.

The controller may determine that the cleaning robot is in a low risk 'object-caught state' when at least one of the first and second encoder variations $A1_{t1}$ and $A2_{t1}$ is less than a first encoder threshold ($A_{th1}=V+V*0.06$), and the inclination value variation B is greater than a reference threshold $B_s$ of the upper portion jammed state.

The controller may rapidly decelerate the driving motors to enable the cleaning robot to escape from the low risk "object-caught state' and provide information suitable for escaping from "object-caught state.

The controller may determine that the cleaning robot is in a high risk 'lifted state' when at least one of the first and second encoder variations A1 and A2 indicates an idle state, and the inclination value variation B is greater than a second inclination threshold ($B_{th2}=\tan-1 (2r/h)$).

The controller may quickly stop the driving motors to enable the cleaning robot to escape from the high risk 'lifted state' and provide information suitable for escaping from the 'lifted state'.

The controller may determine that the cleaning robot is in a high risk upper portion 'jammed stated' when at least one of the first and second encoder variations A1 and A2 is less than a first encoder threshold ($A_{th1}=V+V*0.06$) and greater than a second encoder threshold $A_{th2}$, and the inclination value variation B is greater than a first inclination threshold ($B_{th1}=\pm 3°$), The controller may quickly stop the driving motors to enable the cleaning robot to escape from the high risk upper portion 'jammed state' and provide information suitable for escaping from the upper portion 'jammed state'

The controller may calculate first and second encoder variations $A1_{t2}$ and $A2_{t2}$ the cleaning robot has moved for a second time period t2 based on the measurements of the first and second encoders, calculate an inclination value variation B the cleaning robot has moved based on the sensor information of the tilt sensor, and determine a degree of risk and type of the stuck state of the cleaning robot by using the calculated first and second encoder variations $A1_{t2}$ and $A2_{t2}$ and the calculated inclination value variation B.

The controller may determine that the cleaning robot is in a high risk 'object-caught state' when at least one of the first and second encoder variations $A1_{t2}$ and $A2_{t2}$ is less than a first encoder threshold ($A_{th1}=V+V*0.06$), and the inclination value variation B is greater than a reference threshold $B_s$ of the upper portion jammed state, The controller may quickly stop the driving motors to enable the cleaning robot to escape from the high risk "object-caught state' and provide information suitable for escaping from the "object-caught state'.

In accordance with another aspect of the present disclosure, a cleaning robot including a main body and left and right drive units to move the main body, further includes an input unit to input a motion instruction for the cleaning robot, first and second encoders to measure movement of the left and right drive units moving in accordance with the input motion instruction, and a controller to determine a stuck state of the cleaning robot by using an angle value obtained by calculating an angle the cleaning robot has moved based on measurements of the first and second encoders.

The cleaning robot may further include a tilt sensor to measure an inclination of the cleaning robot, and the controller may determine a stuck state of the cleaning robot by using an angle value obtained by calculating an angle the cleaning robot has moved based on measurements of the first and second encoders and an angle value obtained by measuring an angle the cleaning robot has moved based on sensor information of the tilt sensor.

In accordance with another aspect of the present disclosure, a method of controlling a cleaning robot including a main body and left and right drive units to move the main body includes calculating an angle the cleaning robot has moved by measuring movement of the left and right drive units moving in accordance with an input motion instruction by using first and second encoders, measuring an angle the cleaning robot has moved by using a tilt sensor, and determining a stuck state in which traveling of the cleaning robot is impossible by using the calculated angle of the cleaning robot and the measured angle of the cleaning robot.

According to the cleaning robot and the control method thereof, the cleaning robot detects a stuck state such as 'jammed state', 'lifted state', or 'object-caught state' while traveling by using a motion instruction or sensor information and quickly escapes from the stuck state caused in various traveling conditions by using a wheel structure capable of changing a total height of the cleaning robot.

In addition, the cleaning robot may detect that the cleaning robot is in a stuck state by using sensor information obtained from sensors suitable for small cleaning robots and robot instructions/information regarding surroundings obtained for a predetermined time period and classifying the stuck state, so as to efficiently deal with various stuck states.

Furthermore, the degree of risk and type of the stuck state may be predicted before the cleaning robot is in the stuck state so as to deal with the stuck state in advance. The cleaning robot may efficiently deal with the stuck state according to the degree of risk and type of the stuck state via rapid deceleration or quick stopping in accordance with the predicted degree of the risk of the stuck state and using information for selecting an escaping method suitable for the predicted type of the stuck state.

BRIEF DESCRIPTION OF THE DRAWINGS

These and/or other aspects of the invention will become apparent and more readily appreciated from the following description of the embodiments, taken in conjunction with the accompanying drawings of which:

FIG. 8 is a control block diagram for determine a stuck state of a cleaning robot according to one embodiment of the present disclosure;

FIG. 25, parts (a) and (b), illustrates 'jammed states' of a cleaning robot according to the other embodiment of the present disclosure;

FIG. 26 illustrates 'object-caught states' of a cleaning robot according to the other embodiment of the present disclosure;

DETAILED DESCRIPTION

Figure 1:
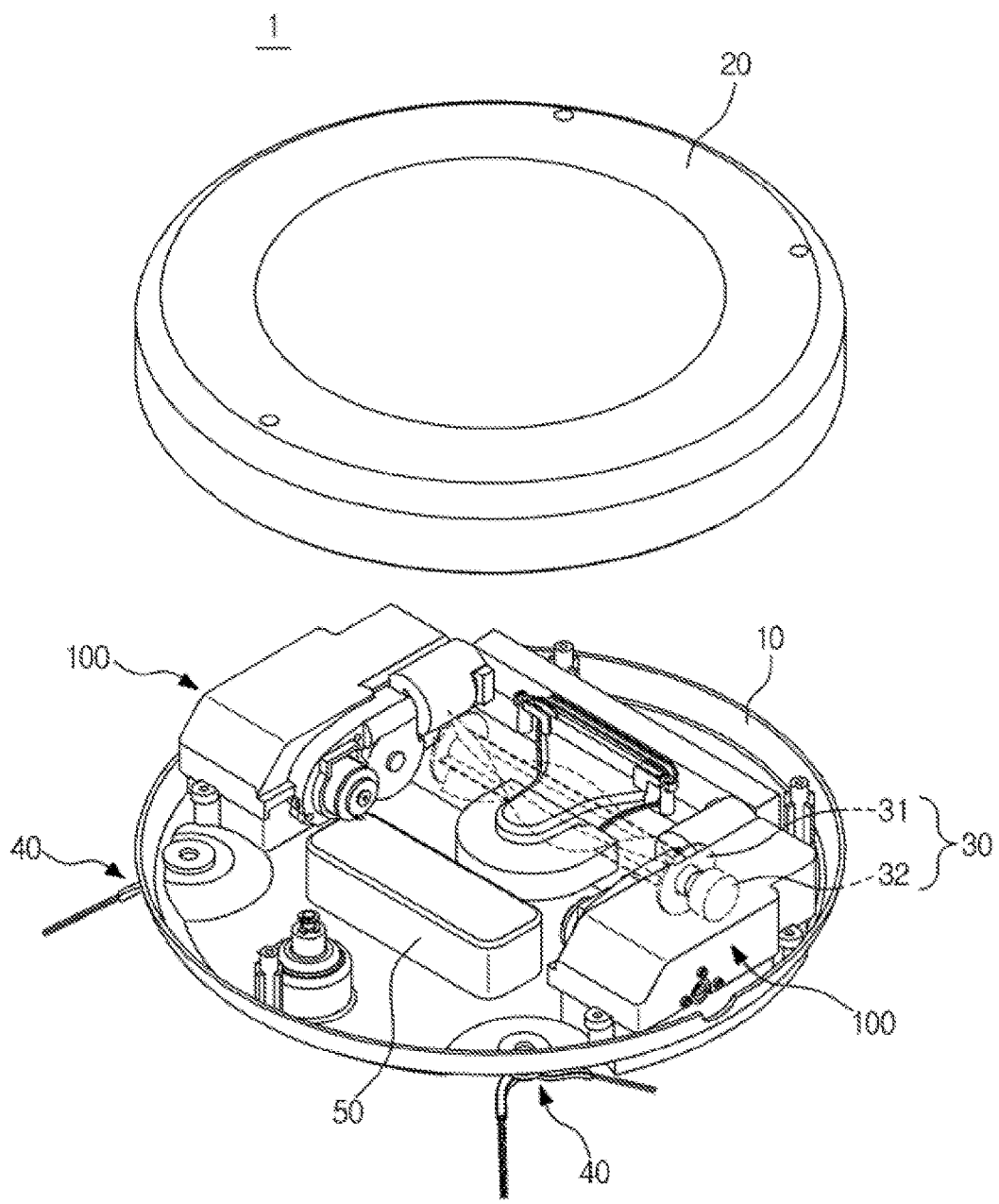
FIG. 1 is a perspective view illustrating a configuration of a cleaning robot according to one embodiment of the present disclosure.

Reference will now be made in detail to the embodiments of the present disclosure, examples of which are illustrated in the accompanying drawings, wherein like reference numerals refer to like elements throughout.

Figure 2:
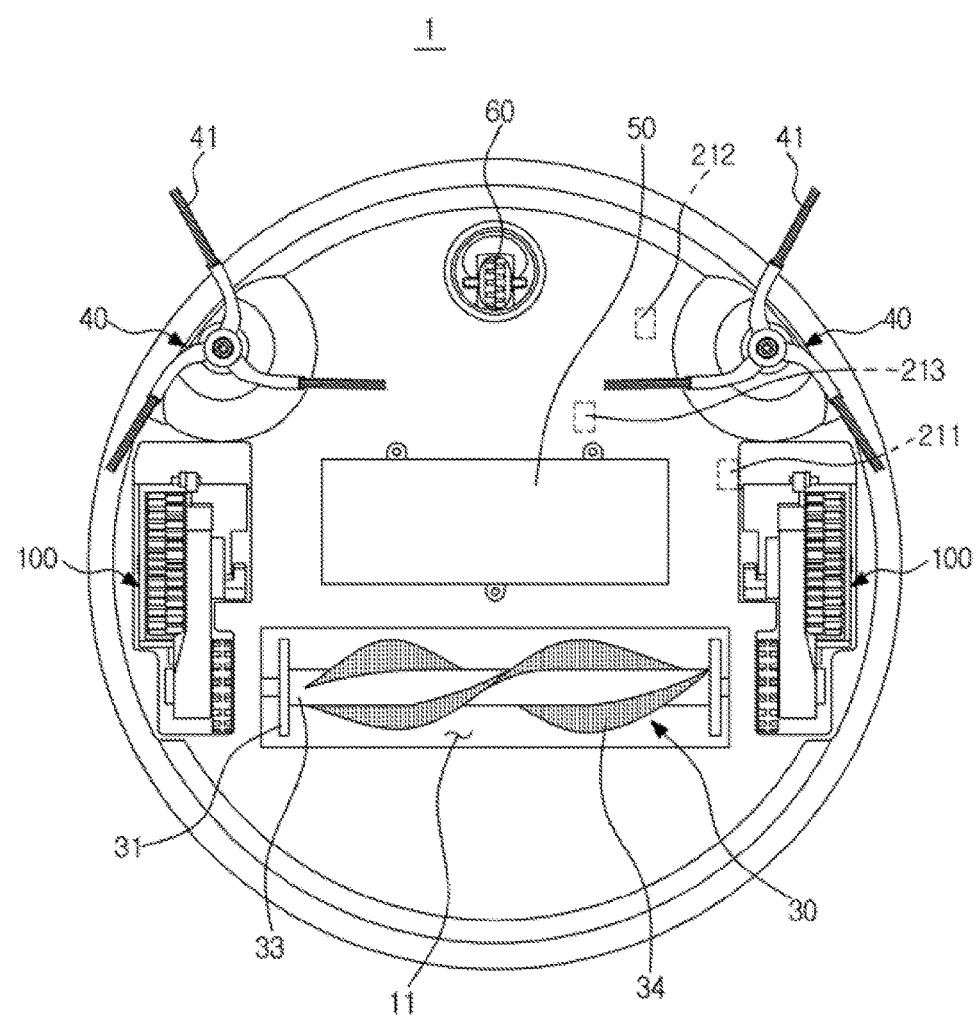
FIG. 2 is a bottom view illustrating a cleaning robot according to one embodiment of the present disclosure.

FIG. 1 is a perspective view illustrating a configuration of a cleaning robot according to one embodiment of the present disclosure. FIG. 2 is a bottom view illustrating a cleaning robot according to one embodiment of the present disclosure.

Referring to FIGS. 1 and 2, a cleaning robot 1 according to an embodiment of the present disclosure includes a main body 10 defining an external appearance of the cleaning robot 1, a cover 20 to cover an upper portion of the main body 10, brush devices 30 and 40 to sweep or scatter dust on a region to be cleaned, a power unit 50 to supply driving power for driving the main body 10, and drive units 100 to move the main body 10.

The main body 10 support various parts mounted therein while defining the external appearance of the cleaning robot 1.

The brush devices 30 and 40 include a main brush device 30 provided adjacent to an suction port 11 formed at the bottom of the main body 10 to sweep or scatter dust, thereby improving dust suction efficiency, and side brush devices 40 installed at opposite sides of the front of the main body 10 to sweep dust on a floor, on which the cleaning robot 1 travels, to the suction port 11.

The main brush device 30 may include a drum type rotary brush unit 31 having a length corresponding to the suction port 11 adjacent to the suction port 11 to be rotated with respect to the floor in a roller fashion to sweep or scatter dust on the floor and a brush motor 32 to rotate the brush unit 31 forward or backward.

The brush unit 31 includes a roller 33 and a brush 34. The roller 33 is configured as a rigid body, rotatably coupled to the main body 10, and driven by the brush motor 32. End caps are mounted on both ends of the roller 33 to prevent foreign substances from entering the brush motor 32. The brush 34 may be formed of an elastic material and implanted in the roller 33. The brush 34 is driven together with the roller 33 to sweep dust or foreign substances on a floor while the cleaning robot 1 travels.

The side brush devices 40 are installed at opposite sides of the front of the main body 10 at a predetermined interval and respectively include brushes 41 that sweep dust on the floor which is not swept by the main brush device 30 and guide the dust toward the suction port 11 while rotating in parallel to the floor.

The power unit 50 includes a battery to supply driving power to a first motor 140 (hereinafter, referred to as a driving motor, see FIG. 3) and a second motor 150 (hereinafter, referred to as a tilting motor, see FIG. 3) of the drive unit 100, the brush motor 32 to rotate the main brush device 30, and other driving devices for driving the main body 10 in a state of being electrically connected thereto. The battery may be a rechargeable secondary battery. When the main body 10 is connected to a docking station (not shown) after cleaning, the battery may be recharged at the docking station.

The drive units 100 may be provided at both sides of the center of the main body 10 and allow the main body 10 to execute moving operations such as forward movement, backward movement, and rotation during the cleaning process.

Both of the drive units 100 may respectively be rotated forward or backward according to an instruction by a controller, which will be described later, to allow the cleaning robot 1 to move forward or backward or rotate. For example, both drive units 100 may be rotated forward or backward to allow the cleaning robot 1 to travel forward or backward. Alternatively, the cleaning robot 1 may be rotated left on the basis of the front by rotating the right drive unit 100 forward while rotating the left drive unit 100 backward. On the contrary, the cleaning robot 1 may be rotated right on the basis of the front by rotating the left drive unit 100 forward while rotating the right drive unit 100 backward.

Hereinafter, the drive unit 100 located at the right side on the basis of the forward movement direction of the main body 10 will be exemplarily described, and a description thereof is also applied to the drive unit 100 located at the left side on the basis of the forward movement direction of the main body 10 unless otherwise stated. The drive unit 100 will be described in detail later with reference to FIGS. 3 to 5.

A caster wheel 60 is rotatably installed at the front of the main body 10 such that an angle of the caster wheel 60 is changed depending upon the state of a floor on which the cleaning robot 1 moves. The caster wheel 60 is used to stabilize the pose of the cleaning robot 1 and prevent the cleaning robot 1 from falling. The caster wheel 60 supports the cleaning robot 1 and may be a roller or caster-shaped wheel.

Meanwhile, although the caster wheel 60 is installed at the front of the main body 10 according to the current embodiment. However, embodiments of the present disclosure are not limited thereto, and the same objects and effects may be achieved even when the caster wheel 60 is installed at the back of the main body 10 or at both the front and back of the main body 10.

In addition, the main body 10 may include an encoder 211 to measure an amount of movement of the drive unit 100 driven in accordance with a motion instruction from a user, a position sensor 212 to measure an actual amount of movement of the cleaning robot, and a tilt sensor 213. The encoder 211, the position sensor 212, and the tilt sensor 213 will be described in detail later with reference to FIG. 8.

The main body 10 may further include a contact sensor and a proximity sensor to sense an obstacle. For example, a bumper (not shown) installed at the front of the main body 10 may be used to sense an obstacle such as a wall, and an infrared sensor (or an ultrasonic sensor) installed at the bottom of the main body 10 may be used to sense an obstacle such as stairs.

Figure 3:
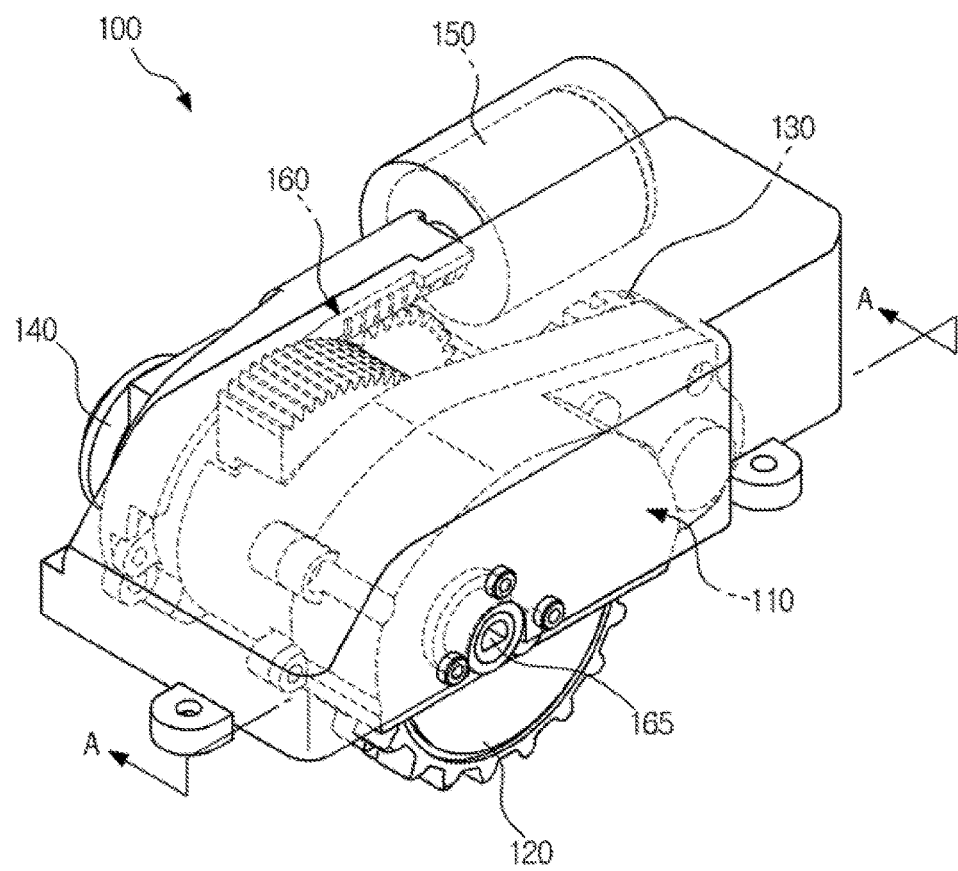
FIG. 3 is a perspective view illustrating an appearance of a drive unit according to one embodiment of the present disclosure.
Figure 4:
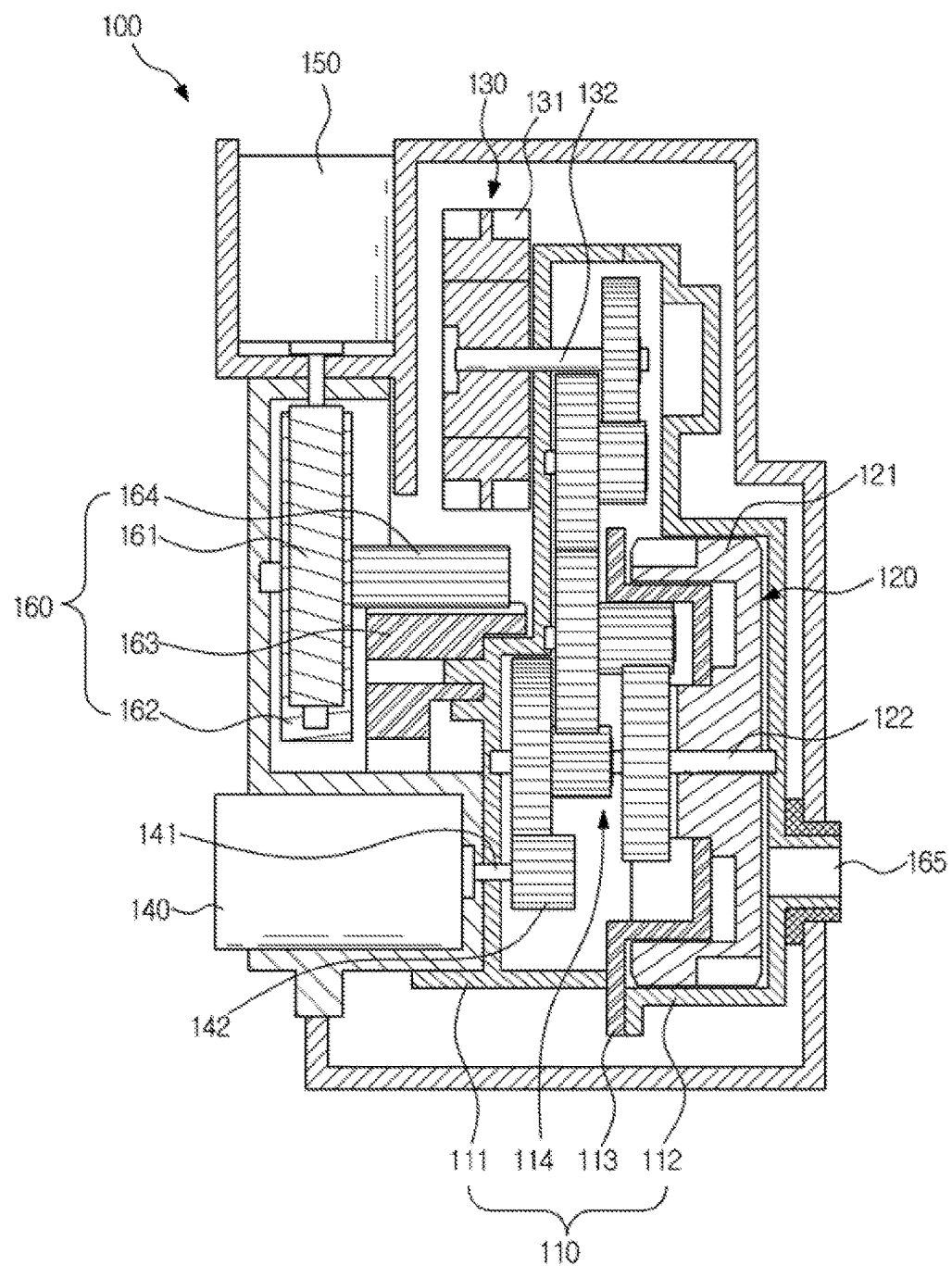
FIG. 4 is a cross-sectional view of the drive unit taken along line A-A of FIG. 3.
Figure 5:
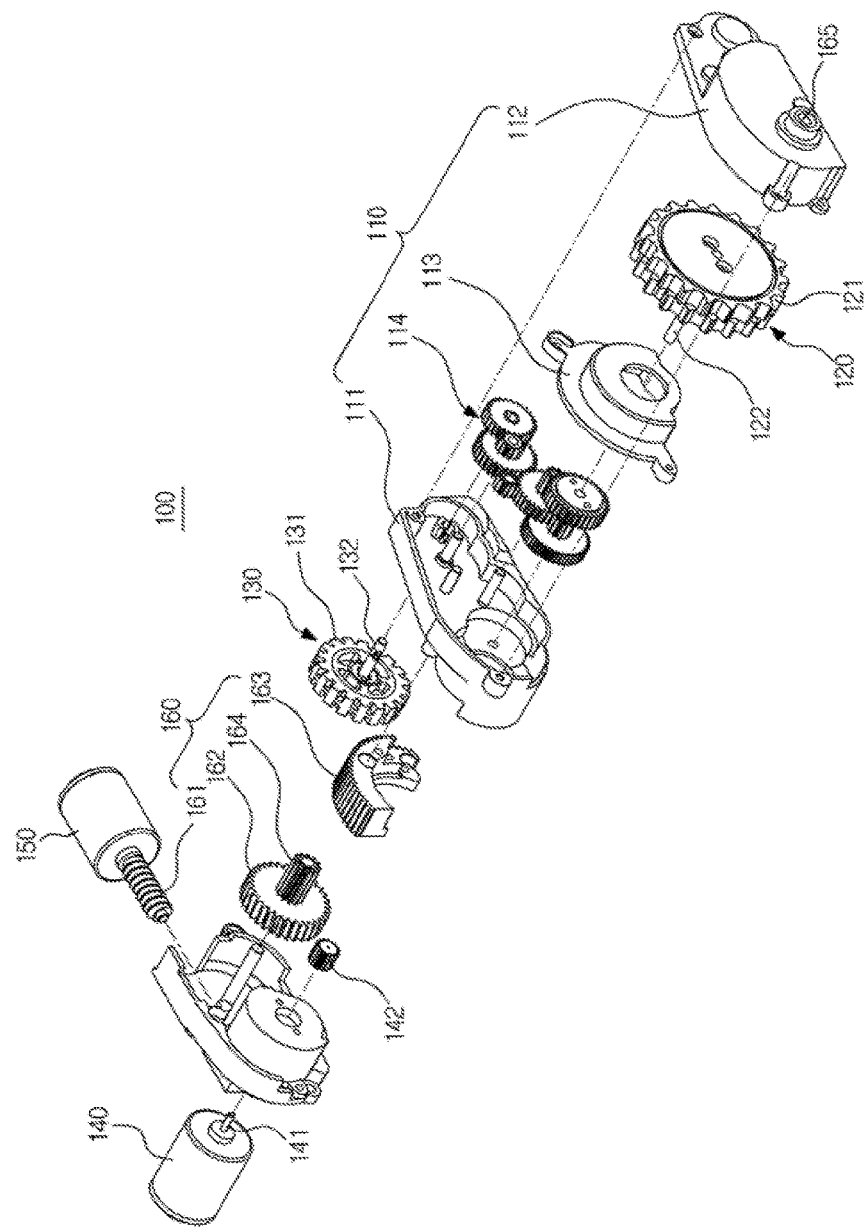
FIG. 5 is an exploded perspective view illustrating the drive unit of FIG. 3.

FIG. 3 is a perspective view illustrating an appearance of a drive unit according to one embodiment of the present disclosure. FIG. 4 is a cross-sectional view of the drive unit taken along line A-A of FIG. 3. FIG. 5 is an exploded perspective view illustrating the drive unit of FIG. 3.

Referring to FIGS. 3 to 5, the drive unit 100 includes a driving frame 110, a main wheel 120 driven for a normal travel mode of the cleaning robot 1, a sub wheel 130 driven to increase a total height of the cleaning robot 1 and to escape from a side jammed state, a driving motor 140 disposed at one side of the driving frame 110 to transmit power to the main wheel 120 and the sub wheel 130, a tilting motor 150 disposed perpendicular to the driving motor 140 to tilt the entire driving frame 110 with respect to a rotation shaft, and a gear unit 160 disposed between the tilting motor 150 and the driving frame 110 to transmit driving force of the tilting motor 150 to the driving frame 110.

The driving frame 110 may include a first frame 111 that receives driving force of the tilting motor 150 to be rotated about a rotation shaft, a second frame 112 that is disposed at an outer portion of the main wheel 120 and coupled to the first frame 111, and a third frame 113 that is disposed at an inner portion of the main wheel 120 and coupled to the second frame 112.

Power transmission gears 114 which are rotated in a state of being engaged with each other by received driving force of the driving motor 140 are arranged in the first frame 111.

The power transmission gears 114 are rotatably supported by the first frame 111 in a state of being engaged with each other and connected to a driving gear 142 coupled to a rotation shaft 141 of the driving motor 140 to transmit driving force of the driving motor 140 to the main wheel 120 and the sub wheel 130.

In addition, the third frame 113 prevents foreign substances from penetrating into the driving frame 110.

The main wheel 120 includes a wheel 121 directly contacting the floor surface of the region to be cleaned so as to execute traveling of the main body 10 and a driving shaft 122 fixed to the wheel 121 to rotate the wheel 121.

In addition, the main wheels 120 are provided at both sides of the center of the main body 10 to allow the cleaning robot 1 to travel in a normal travel mode.

Furthermore, the main wheel 120 has a total height adjustment function while being driven and may reduce the total height of the cleaning robot 1.

The sub wheel 130 includes a wheel 131 contacting the floor surface in a traveling-impossible state (stuck state) of the cleaning robot 1 to move (escape) the cleaning robot 1 and a driving shaft 132 fixed to the wheel 131 to rotate the wheel 131.

In addition, the sub wheel 130 is mounted at an inner portion than the main wheel 120 to allow the cleaning robot 1 to move (escape) from the traveling-impossible stuck state.

Furthermore, since the sub wheel 130 is disposed at an inner portion than the main wheel 120 by about 25 mm on the basis of the forward movement direction, power may be more efficiently restored when one of the main wheels 120 falls in a lateral direction during traveling of the cleaning robot 1 compared with a caterpillar-type.

The sub wheel 130 is not aligned at the same line of the travel direction of the main wheel 120.

The driving motor 140 that is a DC motor transmitting driving power to the main wheel 120 and the sub wheel 130 is coupled to an outer side of the first frame 111. Driving force of the driving motor 140 is simultaneously transmitted to the driving shaft 122 of the main wheel 120 and the driving shaft 132 of the sub wheel 130 through the power transmission gears 114 connected to a driving gear so as to simultaneously drive the main wheel 120 and the sub wheel 130. Meanwhile, the main wheel 120 and the sub wheel 130 are designed to have the same driving velocity.

The tilting motor 150 that is a DC motor aligned perpendicular to the driving motor 140 for space reduction and tilting the entire driving frame 110 with respect to the rotation shaft is coupled to an outer portion of the first frame 111. Driving force of the tilting motor 150 is transmitted to the first frame 111 through the gear unit 160 to rotate the entire driving frame 110.

The gear unit 160 includes a worm gear 161 coupled to the tilting motor 150 to realize a large reduction gear ratio in a small area, a worm wheel 162 connected to the worm gear 161, a tilting gear 163 to rotate the entire driving frame 110 about the rotation shaft in accordance with the rotation of the worm gear 161, and a connection gear 164 to connect the worm wheel 162 with the tilting gear 163.

The worm gear 161 may realize a maximum reduction gear ratio in the same area and prevent backdrivability.

The tilting gear 163 that is a spur gear having 120 degrees connected to the first frame 111 receives driving force of the tilting motor 50 through the worm gear 161 to rotate the driving frame 1110 about a rotation shaft 165. The rotation shaft 165 of the tilting gear 163 is coaxial to the rotation shaft 141 of the driving motor 140.

Figure 6:
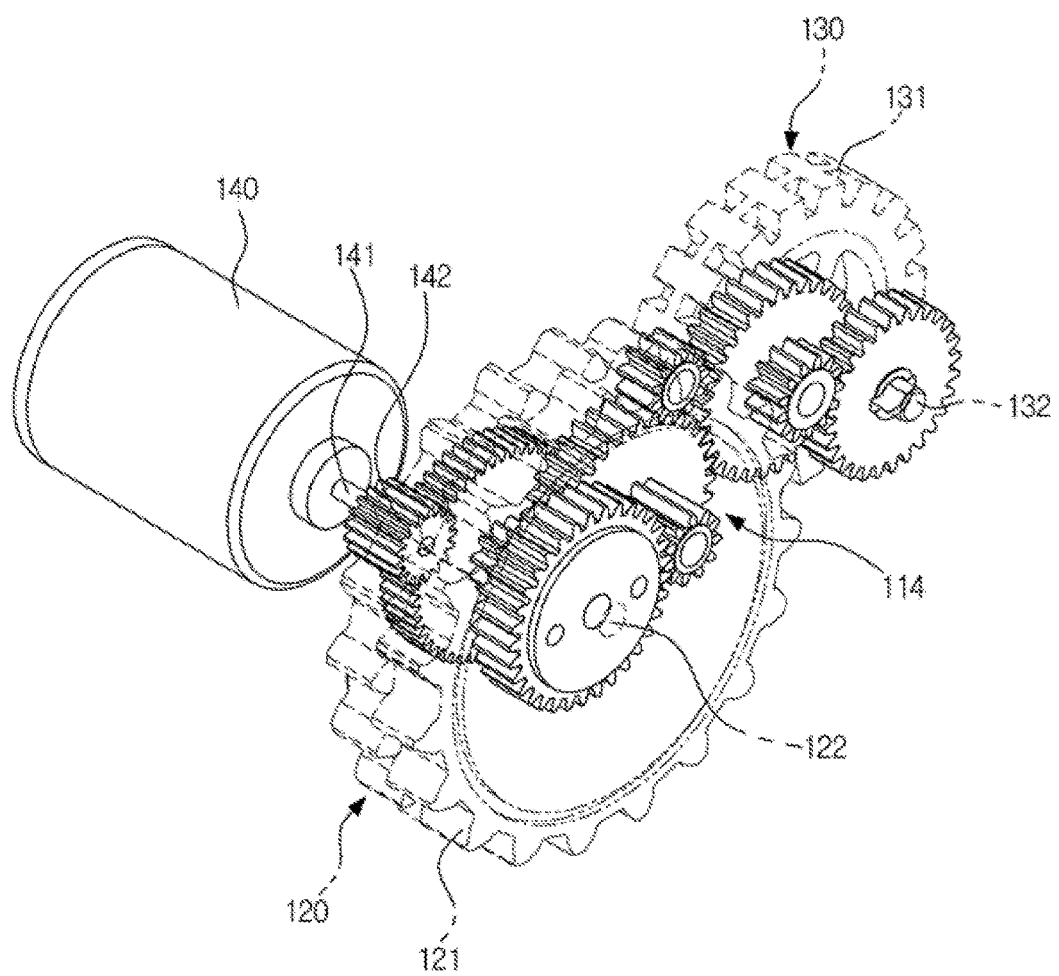
FIG. 6 is a perspective view illustrating a power transmission gear of a driving motor according to one embodiment of the present disclosure.

FIG. 6 is a perspective view illustrating a power transmission gear of a driving motor according to one embodiment of the present disclosure.

Referring to FIG. 6, as power is supplied to the driving motor 140, the driving motor 140 is rotated. Accordingly, the driving gear 142 coupled to the rotation shaft 141 of the driving motor 140 is rotated, and driving force of the driving motor 140 is transmitted to the driving shafts 122 and 132 of the main wheel 120 and the sub wheel 130 through the power transmission gears 114 connected to the driving gear 142, thereby simultaneously driving the main wheel 120 and the sub wheel 130.

Since the sub wheel 130 is in a raised state while the cleaning robot 1 travels in a normal travel mode, only the main wheel 120 contacts the floor of the region to be cleaned to allow the main body 10 to execute traveling operations such as forward movement, backward movement, and rotation.

Figure 7:
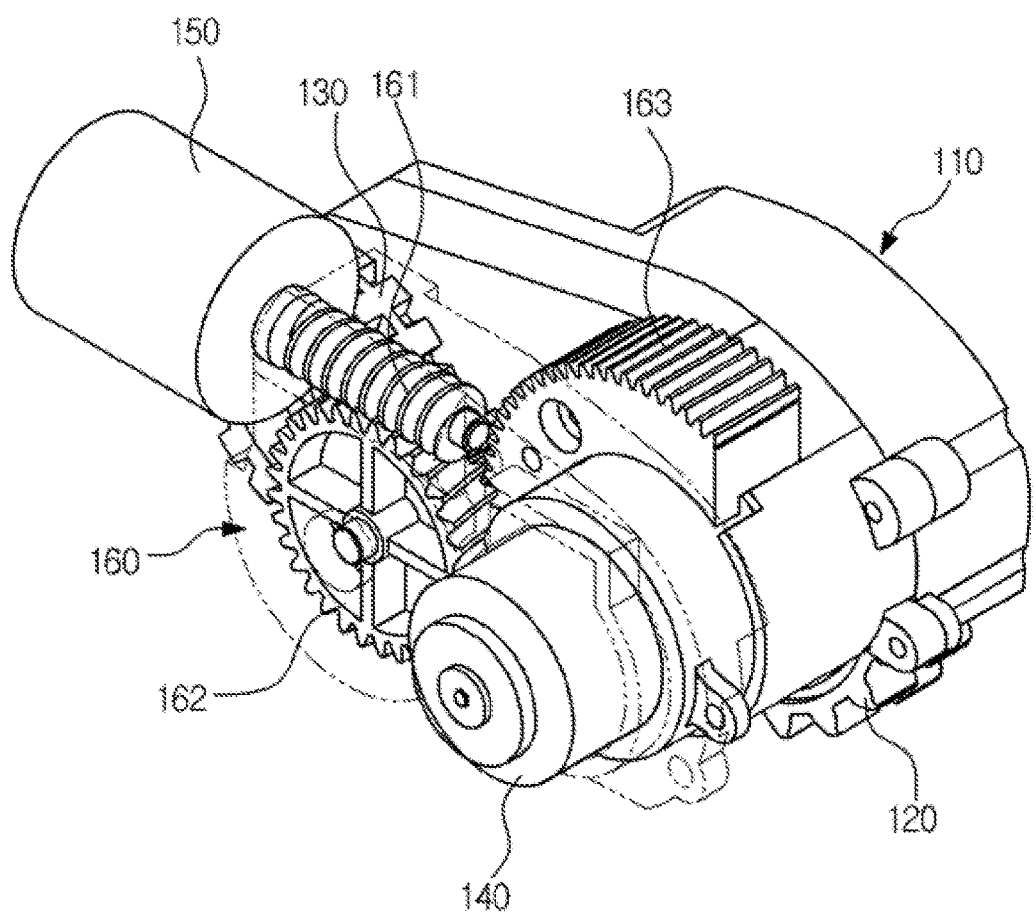
FIG. 7 is a perspective view illustrating a power transmission gear of a tilting motor according to an embodiment of the present disclosure.

FIG. 7 is a perspective view illustrating a power transmission gear of a tilting motor according to one embodiment of the present disclosure.

Referring to FIG. 7, as power is supplied to the tilting motor 150, the tilting motor 150 is rotated. Accordingly, the worm gear 161 coupled to the tilting motor 150 is rotated, and the worm wheel 162 and the connection gear 164 are rotated in accordance with the rotation of the worm gear 161, thereby rotating the tilting gear 163. As the tilting gear 163 is rotated, the entire driving frame 110 is rotated by the first frame 111 connected to the tilting gear 163, thereby changing the position of the sub wheel 130.

When the cleaning robot 1 is in the traveling-impossible stuck state, the position of the sub wheel 130 may be changed according to the types of the stuck state such that the main wheel 120 and the sub wheel 130 selectively or simultaneously contacts the floor of the region to be cleaned to allow the cleaning robot 1 to escape from the stuck state and to execute traveling operations such as forward movement, backward movement, or rotation.

FIG. 8 is a control block diagram to determine a stuck state of a cleaning robot according to one embodiment of the present disclosure.

Referring to FIG. 8, the cleaning robot 1 according to an embodiment of the present disclosure may further include an input unit 200 to receive a motion instruction from a user, a sensor unit 210 to detect a variety of information regarding the region to be cleaned where the cleaning robot 1 travels, a controller 220 that determines a traveling-impossible state (stuck state) of the cleaning robot 1 according to the motion instruction from the input unit 200 and the sensor information of the sensor unit 210 and controls the tilting motor 150 to escape from the stuck state, a driving motor 140 to drive the main wheel 120 and the sub wheel 130 in accordance with a driving instruction from the controller 220, and a tilting motor 150 to change the position of the sub wheel 130 in accordance with an escape instruction from the controller 220.

The input unit 200 includes a plurality of buttons on an upper portion of the main body 10 or a remote control (not shown) to receive a motion instruction or a cleaning instruction for the cleaning robot 1 from the user and transmit the input information to the controller 220.

The sensor unit 210 may include an encoder 211 to measure an amount of movement of the driving motor 140 that is rotated in accordance with the motion instruction from the user, a position sensor 212 to measure a distance the cleaning robot 1 has actually moved, a tilt sensor 213 to measure an angle (direction) the cleaning robot 1 has actually moved, and a current sensor 214 to measure current flowing through the tilting motor 150.

The encoder 211 is mounted on the driving motor 140 to measure the amount of movement of the cleaning robot 1 according to the motion instruction and may be replaced with an amount of movement obtained via inverse calculation from the motion instruction for the cleaning robot 1.

In addition, the encoder 211 is configured to generate a position variation according to intended movement of the cleaning robot 1 and calculates the intended movement of the cleaning robot 1. In this process, a distance variation and an angle variation of the cleaning robot 1 acquired in accordance with the motion instruction for the cleaning robot 1 are subjected to low-pass filtering (LPF) to compensate a system delay, and the distance variation and the angle variation acquired by the encoder 211 are subjected to LPF to remove noise. The distance variation and the angle variation of the cleaning robot 1 acquired by the encoder 211 is prioritized. However, when the distance variation and the angle variation of the cleaning robot 1 acquired in accordance with the motion instruction are significantly different from those acquired by the encoder 211, the distance variation and the angle variation of the cleaning robot 1 acquired according to the motion instruction are used to calculate the distance variation and the angle variation of the cleaning robot 1 intended by the motion instruction for the cleaning robot 1.

This is because, while information acquired by the encoder 211 is adopted as the movement variation intended by the motion instruction for the cleaning robot 1 to obtain accurate information of actual movement, values of intended movement are compensated by using the distance variation and the angle variation of the cleaning robot 1 calculated in accordance with the motion instruction when movement of the cleaning robot 1 is limited by a jammed state of the wheel, or the like.

The position sensor 212 measures an actual amount of movement of the cleaning robot 1. An optical flow sensor may be used in the absence of light or even when there are no features on ceilings. A position variation from a mounting position of the optical flow sensor read by the optical flow sensor is converted into coordinates of the center of the cleaning robot 1 and used. When localization or simultaneous localization and mapping (SLAM), which is a technique of detecting an absolute position, operates, a position estimated thereby may also be used. Thus, an actual position calculation value of the cleaning robot 1 estimated by a technique capable of measuring the actual position of the cleaning robot 1 may be used. These values obtained as described above are subjected to LPF to remove noise.

In addition, the position sensor 212 may be installed at any position capable of measuring the amount of actual movement of the cleaning robot 1, and at least one position sensor 212 may be installed.

The tilt sensor 213 that is a sensor module capable of measuring an inclination of the cleaning robot 1 includes not only a gyro sensor, which directly measures the inclination by using a gravity direction, but also a sensor fusion of a tri-axial accelerometer and a tri-axial angular rate sensor detecting an inclination of the cleaning robot 1.

The tilt sensor 213 may also include a dual-axis tilt sensor capable of detecting stuck possibility, creating stuck conditions, and measuring a roll/pitch value by measuring an inclination and an inclination variation of the cleaning robot 1.

The current sensor 214 is installed at a power circuit to measure a load (torque or current value) applied to the tilting motor 150 and transmits the measured value to the controller 220.

Thus, the controller 220 detects whether the sub wheel 130 is restricted by measuring current flowing through the tilting motor 150 by using the current sensor 214 when the position of the sub wheel 130 is changed, and then finally judges a stuck state of the cleaning robot 1.

For example, on the assumption that the cleaning robot 1 gets stuck, when abnormally high current flows through the tilting motor 150 while lowering the sub wheel 130, the controller 220 determines that the sub wheel 130 is restricted and that the traveling-impossible stuck state of the cleaning robot 1 is an upper portion 'jammed state'.

On the other hand, on the assumption that the cleaning robot 1 gets stuck, when abnormally high current does not flow through the tilting motor 150 while lowering the sub wheel 130, the controller 220 determines that the sub wheel 130 is not restricted and that the traveling-impossible stuck state of the cleaning robot 1 is a 'lifted state'.

The controller 220 that controls the overall operation of the cleaning robot 1 controls the driving motor 140 to allow the cleaning robot 1 to travel in accordance with the motion instruction from the input unit 200.

In addition, the controller 220 judges the traveling-impossible state (stuck state) of the cleaning robot 1 in accordance with the motion instruction of the input unit 200 and sensor information of the sensor unit 210 and controls the tilting motor 150 to allow the cleaning robot 1 to escape from the stuck state.

To this end, the controller 220 includes a first distance calculation unit 221 to estimate a distance variation L1 of the cleaning robot 1 to be traveled in accordance with the motion instruction from the input unit 200, a second distance calculation unit 222 to calculate a variation in a distance L2 the cleaning robot 1 has moved based on measurements of the encoder 211, a third distance calculation unit 223 to calculate a variation in a distance L3 the cleaning robot 1 has moved based on sensor information of the position sensor 212, a first angle calculation unit 224 to calculate a variation in an angle G1 the cleaning robot has moved based on measurements of the encoder 211, a second angle calculation unit 225 to calculate a variation in an angle G2 the cleaning robot 1 has moved based on sensor information of the tilt sensor 213, a first stuck candidate detection unit 226 to detect a traveling-impossible state of the cleaning robot 1 based on the distance variations L1, L2, and L3 calculated by the first to third distance calculation units 221, 222, and 223, a second stuck candidate detection unit 227 to detect a traveling-impossible state of the cleaning robot 1 based on the variations in the angle G1 and G2 calculated by the first and second angle calculation units 224 and 225, and a stuck determination unit 228 to determine the stuck state of the cleaning robot 1 using stuck candidates detected by the first and second stuck candidate detection units 226 and 227.

The stuck determination unit 228 may further include a wheel restriction detection unit 229 to detect a restriction state of the sub wheel 130 by measuring current flowing through the tilting motor 150, which drives the sub wheel 130, by using the current sensor 214 after determining the traveling-impossible state of the cleaning robot 1.

The cleaning unit 230 drives the main and side brushes to perform cleaning operation by sucking up foreign substances such as dust from the floor of the region to be cleaned where the cleaning robot 1 travels in accordance with the driving instruction from the controller 220.

The storage unit 240 stores a traveling pattern and a traveling path pre-defined according to the cleaning instruction for the cleaning robot 1 and sensor information detected while the cleaning robot 1 travels.

The storage unit 240 may also store map information of the region to be cleaned.

Hereinafter, operations and effects of the cleaning robot and a control method thereof according to an embodiment of the present disclosure will be described.

Figure 9A:
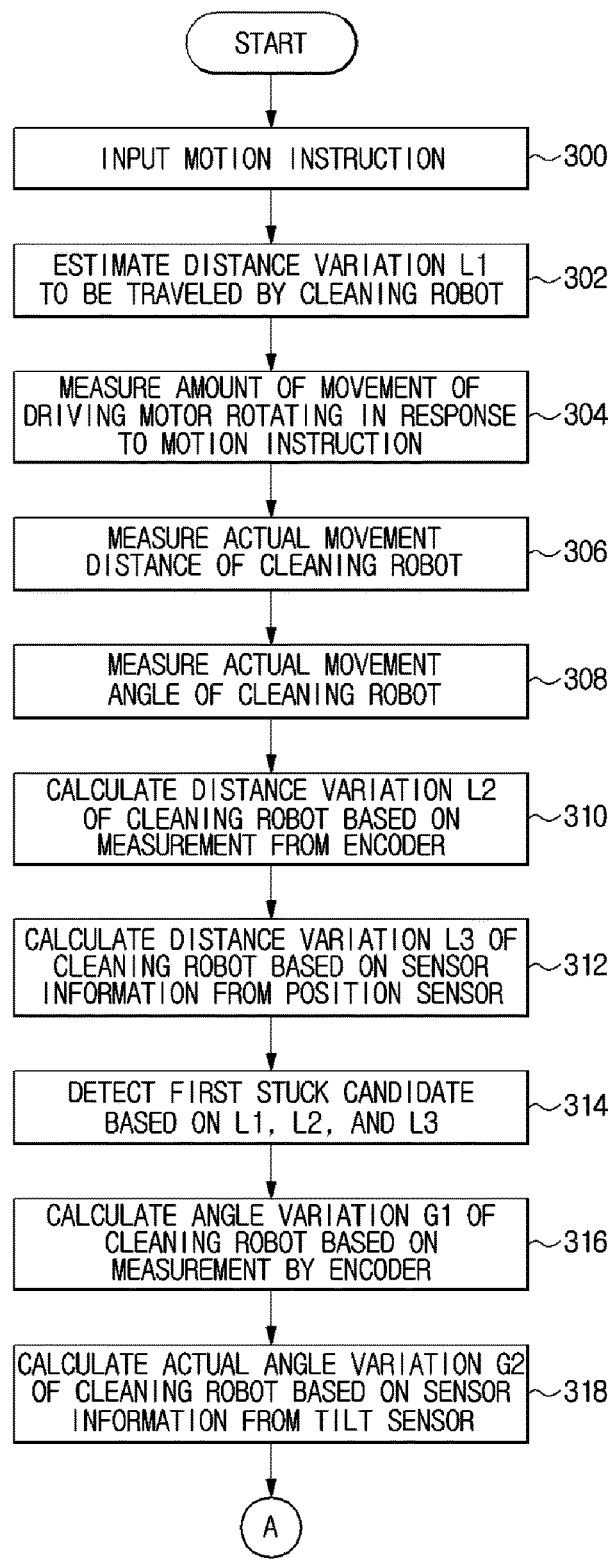
FIGS. 9A and 9B are flowcharts illustrating a method of controlling traveling of a cleaning robot according to one embodiment of the present disclosure.
Figure 9B:
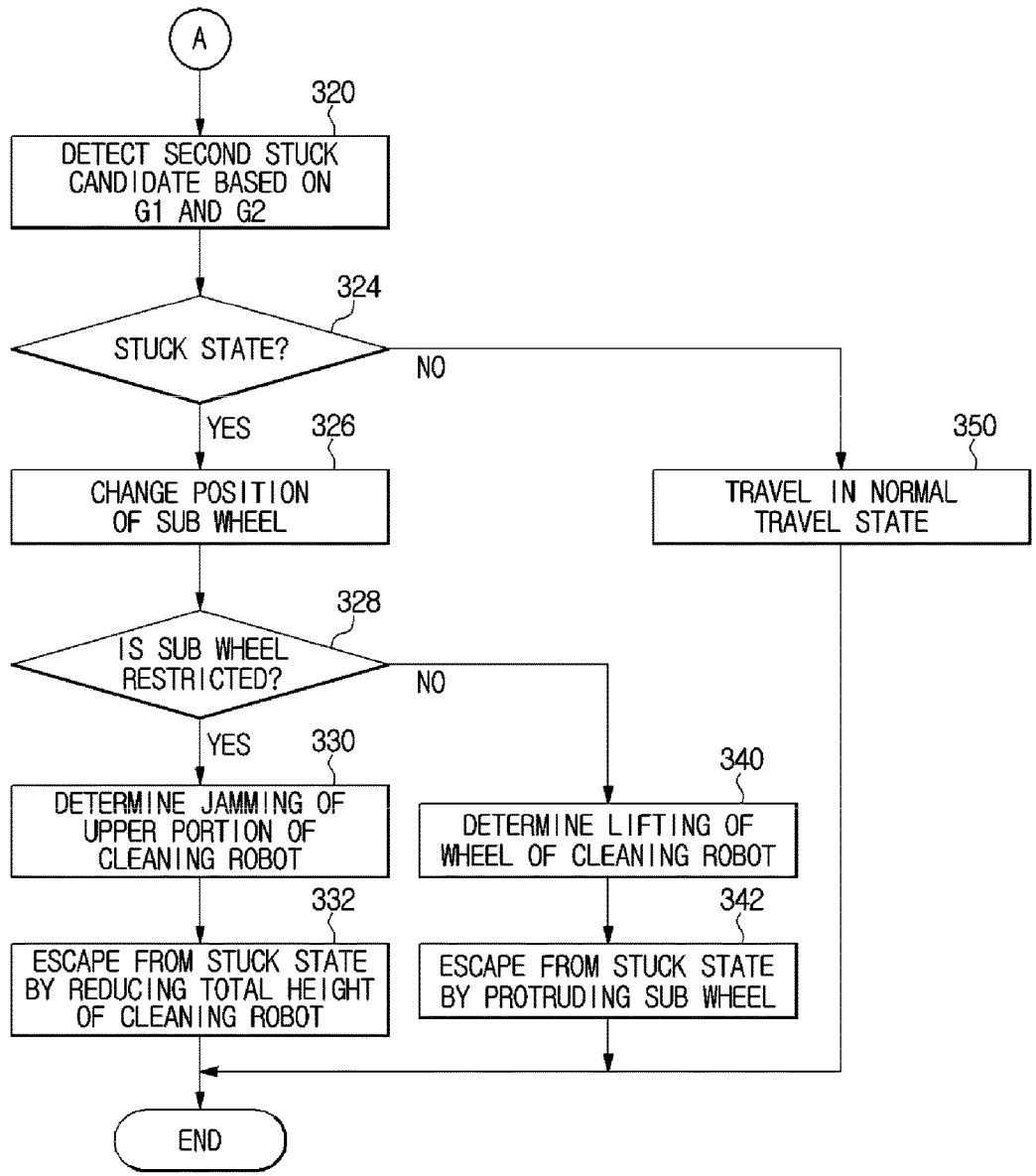

FIGS. 9A and 9B are flowcharts illustrating a method of controlling traveling of a cleaning robot according to an embodiment of the present disclosure.

Referring to FIGS. 9A and 9B, when a user inputs a motion instruction for the cleaning robot 1 through the input unit 200 (300), the controller 220 receives the motion instruction input via the input unit 200 and estimates the distance variation L1 of the cleaning robot 1 to be traveled by using the first distance calculation unit 221 (302).

Then, the controller 220 rotates the driving motors 140 installed at opposite sides of the main body 10 in accordance with the motion instruction to rotate the main wheels 120 forward or backward (in a regular direction or in a reverse direction), such that the cleaning robot 1 travels on the floor along a predetermined travel pattern (right-angle travel pattern or random travel pattern).

As such, the encoder 211 measures the amount of movement of the driving motor 140 (movement distance and movement angle of the driving motor 140) rotated in accordance with the motion instruction and transmits the measurements to the controller 220 (304).

In this regard, the position sensor 212 measures the distance the cleaning robot 1 has actually moved and transmits the measurements to the controller 220 (306), and the tilt sensor 213 measures the angle (direction) the cleaning robot 1 has actually moved and transmits the measurements to the controller 220 (308).

Accordingly, the controller 220 calculates the variation in the distance L2 the cleaning robot 1 has moved based on the measurements of the encoder 211 through the second distance calculation unit 222 (310) and calculates the variation in the distance L3 the cleaning robot 1 has moved based on the sensor information of the position sensor 212 through the third distance calculation unit 223 (312).

Accordingly, the controller 220 detects a first stuck candidate that detects the traveling-impossible state of the cleaning robot 1 based on the distance variations L1, L2, and L3 respectively calculated by the first to third distance calculation units 221, 222, and 223 through the first stuck candidate detection unit 226 (314).

The first stuck candidate is detected based on an instantaneous amount of movement of the cleaning robot 1. It is determined whether the cleaning robot 1 is in a traveling-impossible state by comparing and analyzing the distance variation L3 calculated based on sensor information of the position sensor 212, the distance variation L2 calculated based on the measurements of the encoder 211, and the distance variation L1 estimated in accordance with the motion instruction.

Then, the controller 220 calculates the variation in the angle G1 the cleaning robot 1 has moved based on the measurements of the encoder 211 through the first angle calculation unit 224 (316) and calculates the variation in the angle G2 the cleaning robot 1 has moved based on the sensor information of the tilt sensor 213 through the second angle calculation unit 225 (318).

Accordingly, the controller 220 detects a second stuck candidate that detects the traveling-impossible state of the cleaning robot 1 based on the variations in the angle G1 and G2 respectively calculated by the first and second angle calculation units 224 and 225 through the second stuck candidate detection unit 227 (320).

The second stuck candidate is detected based on an instantaneous angle difference of the cleaning robot 1. It is determined whether the cleaning robot 1 is in a traveling-impossible state by comparing the variation in the angle G2 calculated based on the sensor information of the tilt sensor 213 with the variation in the angle G1 calculated based on the measurements of the encoder 211 to check whether the difference between the variation in the angle G1 and the variation in the angle G2 is greater than a threshold.

When the first and second stuck candidates are detected, the controller 220 determines whether the cleaning robot 1 is in the traveling-impossible stuck state using the detected first and second stuck candidates (324).

As a result of determination in operation 324, when the cleaning robot 1 is in the stuck state, the controller 220 drives the tilting motor 150 to change the position of the sub wheel 130 (326). In this regard, the position of the sub wheel 130 is moved to a target position to the lowest position.

When the position of the sub wheel 130 is changed, the current sensor 214 measures current flowing through the tilting motor 150 and transmits the measurements to the controller 220.

Thus, the controller 220 determines whether the sub wheel 130 is restricted by detecting whether abnormally high current flows through the tilting motor 150, which lowers the sub wheel 130, based on the current measured by the current sensor 214 (328).

As a result of determination in operation 328, when the sub wheel 130 is restricted, the controller 220 determines that the cleaning robot 1 enters a narrow space of an obstacle (e.g., space under a bed or sofa), and an upper portion of the cleaning robot 1 is jammed (330). Then, the controller 220 reduces the total height of the cleaning robot 1 and controls the cleaning robot 1 to travel in a direction opposite to the entered direction to escape from the stuck state (332).

Meanwhile, as a result of determination in operation 328, when the sub wheel 130 is not restricted, the controller 220 determines that the cleaning robot 1 climbed on an obstacle, and the main wheel 120 of the cleaning robot 1 is lifted (340). Then, the controller 220 protrudes the sub wheel 130 downward and controls the cleaning robot 1 to escape from the stuck state (342).

Meanwhile, as a result of determination in operation 324, when the cleaning robot 1 is not in the stuck state, the controller 220 does not drive the tilting motor 150 and controls the cleaning robot 1 to travel in a normal travel mode using the main wheel 120 (350).

Meanwhile, restriction of the sub wheel 130 is detected by measuring current flowing through the tilting motor 150 according to the description given above. However, the embodiments of the present disclosure are not limited thereto, and the same objects and effects may be achieved by detecting restriction of the sub wheel 130 using motion instruction values and measurements by the encoder installed in the tilting motor 150.

Figure 10:
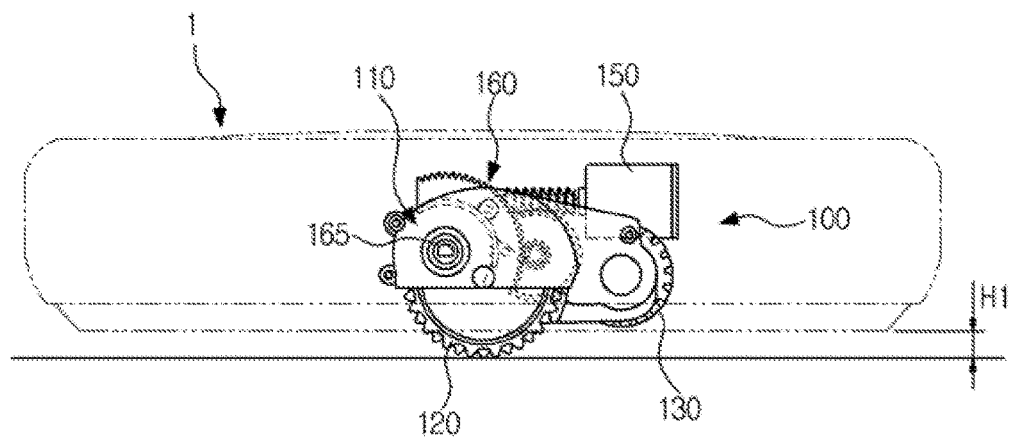
FIG. 10 is a front view illustrating a cleaning robot traveling in a normal travel mode according to one embodiment of the present disclosure.
Figure 11:
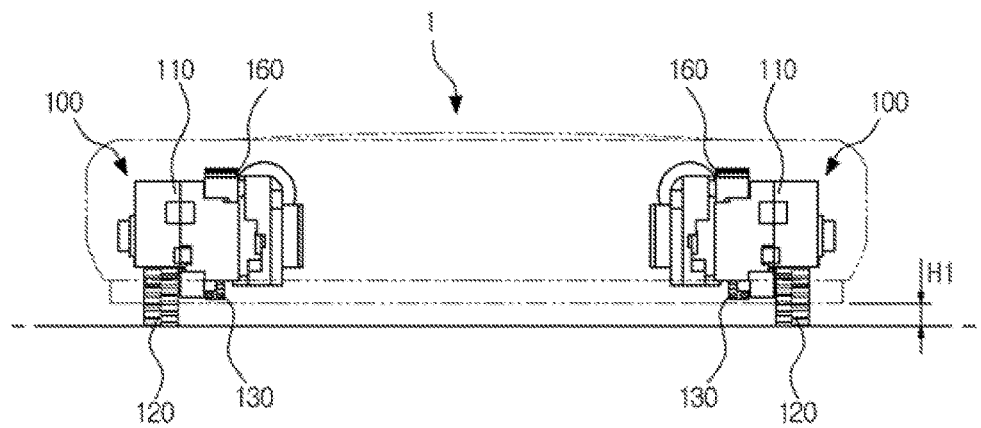
FIG. 11 is a side view illustrating the cleaning robot of FIG. 10.
Figure 12:
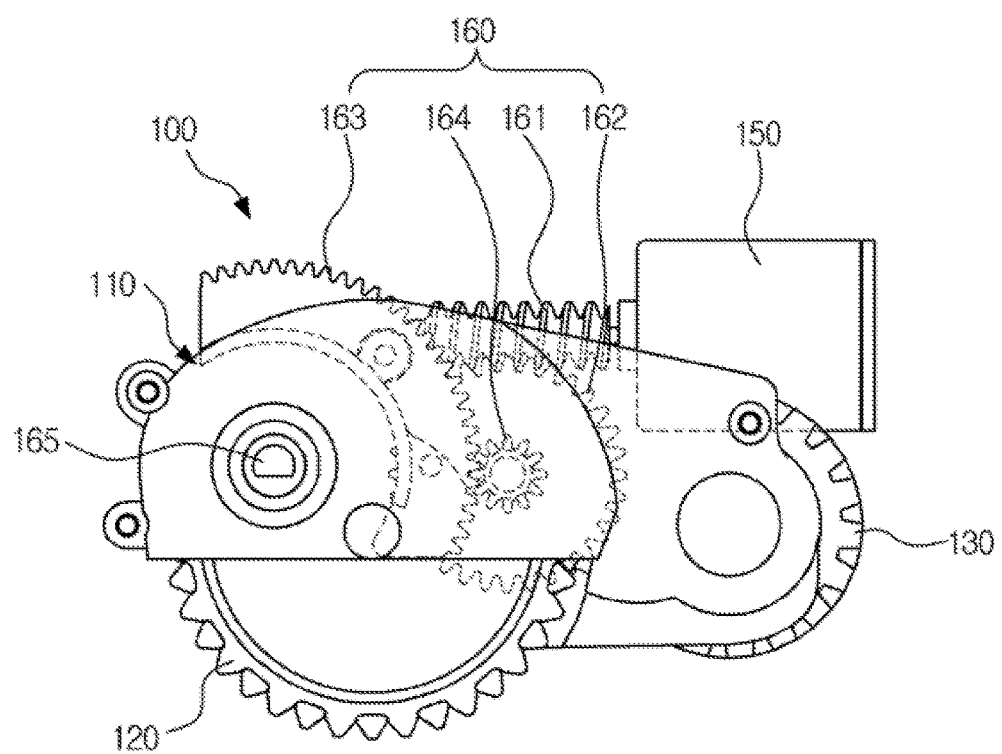
FIG. 12 is a diagram illustrating positions of a main wheel and a sub wheel illustrated in FIGS. 10 and 11 in detail.

FIG. 10 is a front view illustrating a cleaning robot traveling in a normal travel mode according to an embodiment of the present disclosure. FIG. 11 is a side view illustrating the cleaning robot of FIG. 10. FIG. 12 is a diagram illustrating positions of a main wheel and a sub wheel illustrated in FIGS. 10 and 11 in detail.

Referring to FIGS. 10 to 12, while the cleaning robot 1 travels in a normal travel mode, a height (ride height) H1 between the bottom surface of the cleaning robot 1 and the floor is 10 mm, and the sub wheel 130 is in the raised state. Thus, the main body 10 travels in a state that only the main wheel 120 contacts the floor surface of the region to be cleaned.

Figure 13:
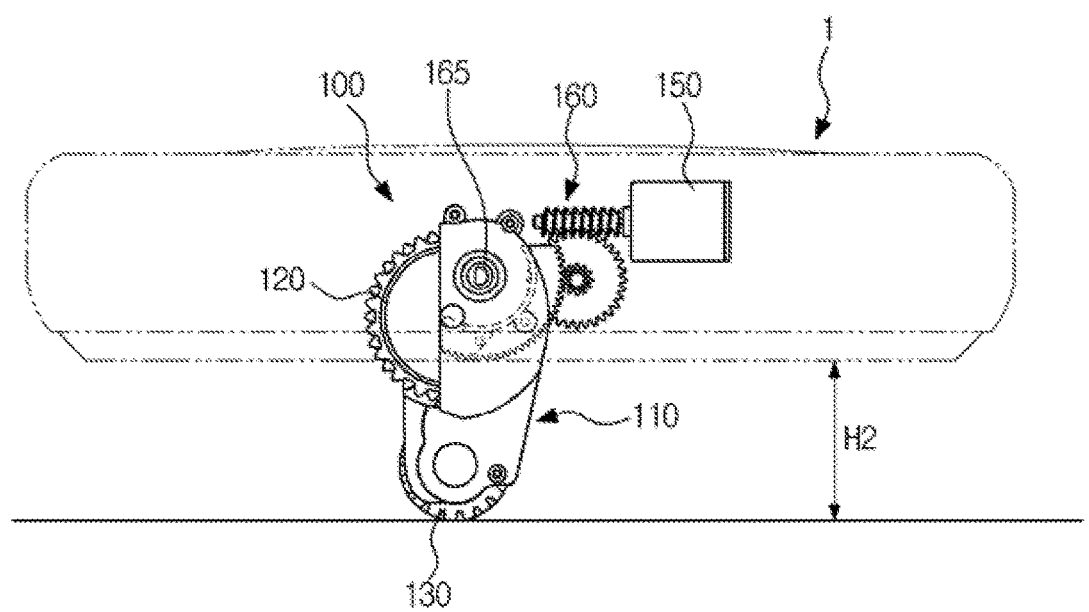
FIG. 13 is a front view illustrating a cleaning robot in which a sub wheel protrudes to escape from a stuck state such as 'lifted state' according to one embodiment of the present disclosure.
Figure 14:
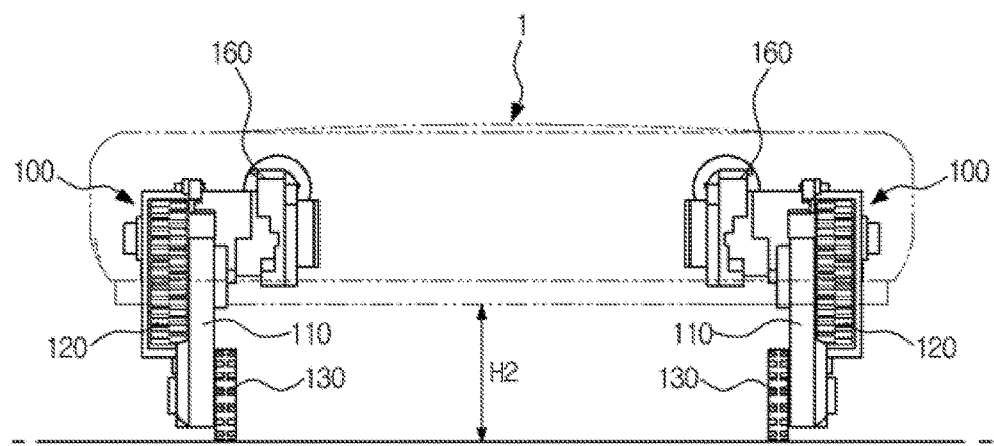
FIG. 14 is a side view illustrating the cleaning robot of FIG. 13.
Figure 15:
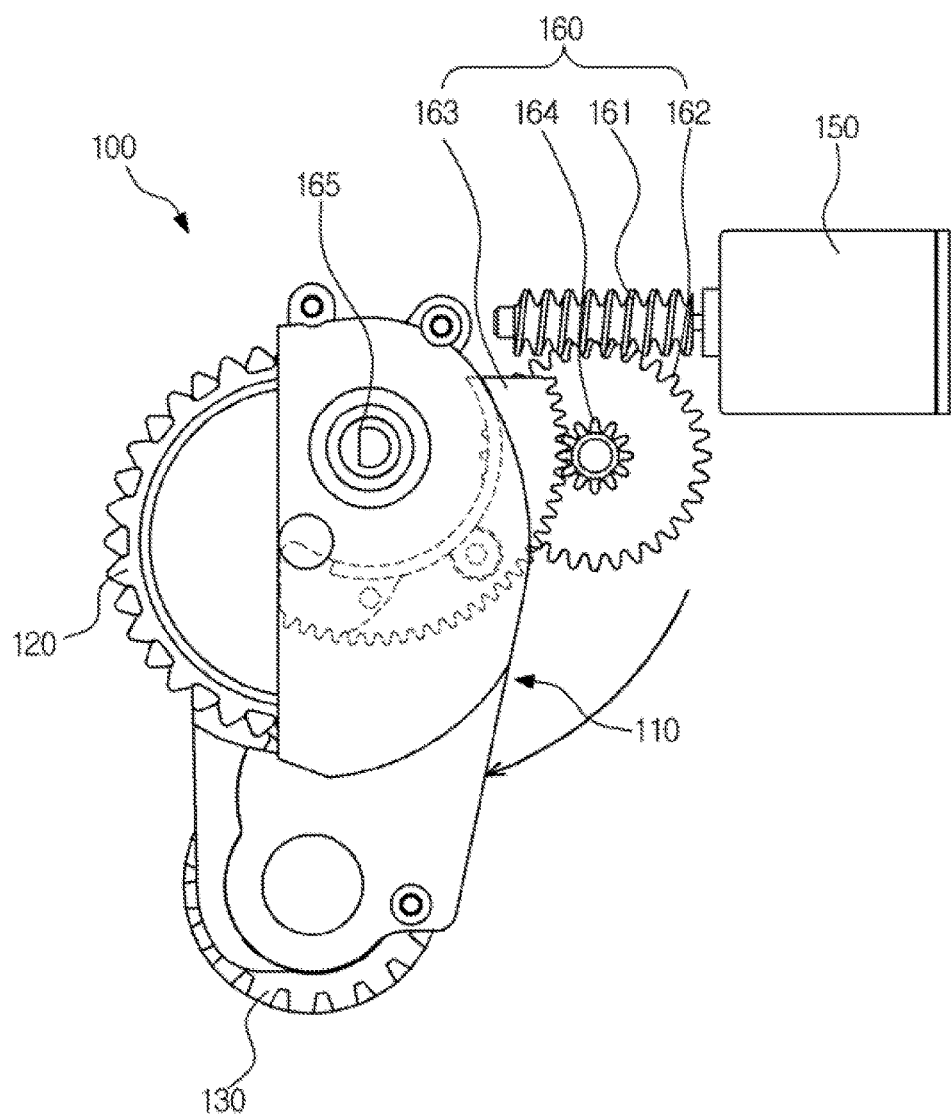
FIG. 15 is a diagram illustrating positions of a main wheel and a sub wheel illustrated in FIGS. 13 and 14 in detail.

FIG. 13 is a front view illustrating a cleaning robot in which a sub wheel protrudes to escape from a stuck state such as a 'lifted state' according to an embodiment of the present disclosure. FIG. 14 is a side view illustrating the cleaning robot of FIG. 13. FIG. 15 is a diagram illustrating positions of a main wheel and a sub wheel illustrated in FIGS. 13 and 14 in detail.

Referring to FIGS. 13 to 15, when the cleaning robot 1 climbs on an obstacle and the bottom surface of the cleaning robot 1 gets stuck, the driving wheels of the cleaning robot 1 are lifted to cause the traveling-impossible stuck state. In this case, driving force is restored by slowly protruding the sub wheel 130 by tilting the driving frame 110 downward to change the position of the sub wheel 130.

When the driving frame 110 is lowered, the main wheel 120 may contact the floor to a predetermined angle. When the tilt angle is about 20 degrees, driving force may be transmitted in a state that the main wheel 120 and the sub wheel 130 simultaneously contact the floor. In this case, the main wheel 120 and the sub wheel 130 have the same velocity and have the largest contact area with the floor, thereby efficiently escaping from a large area obstacle. When the tilt angle is greater than 20 degrees, the sub wheel 130 raises the main body 10 in a tilted state, and the tilt angle is limited to 80 degrees. Here, a height H2 between the bottom surface of the cleaning robot 1 and the floor is 55 mm increased from 10 mm by 45 mm. Furthermore, since the sub wheel 130 is disposed at an inner portion than the main wheel 120 by about 25 mm on the basis of the forward movement direction, power may be more efficiently restored when one of the main wheels 120 falls in a lateral direction while the cleaning robot 1 travels compared with a caterpillar-type.

When driving force is restored as the main wheel 120 or the sub wheel 130, which is idling or is not in sufficient contact with the floor, contacts the floor, current flowing through the tilting motor 150 increases, thereby stopping protruding. After escaping from the obstacle, the cleaning robot 1 is controlled to return to the normal travel mode as illustrated in FIGS. 10 to 12 and restore cleaning performance.

Figure 16:
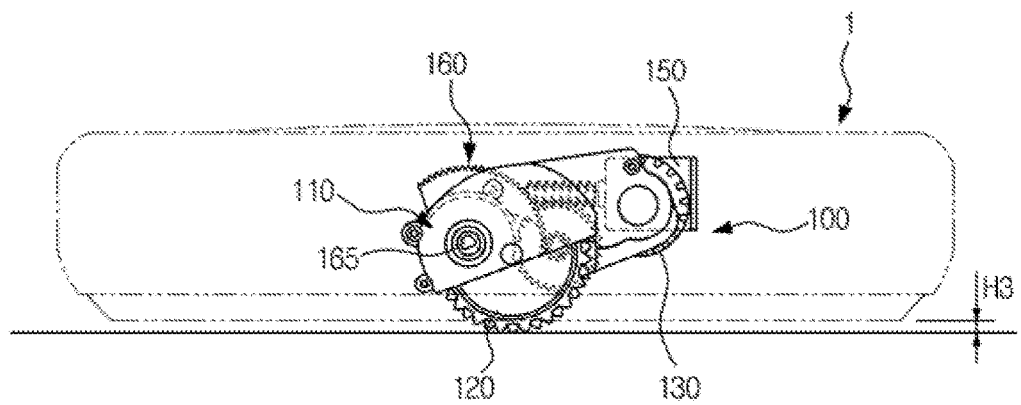
FIG. 16 is a front view illustrating a cleaning robot in which a total height of the cleaning robot is reduced to escape from a stuck state such as 'jammed state' according to one embodiment of the present disclosure.
Figure 17:
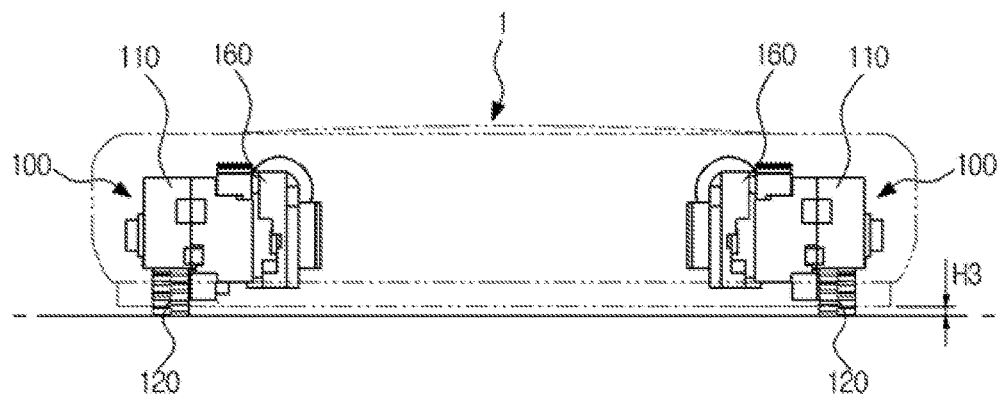
FIG. 17 is a side view illustrating the cleaning robot of FIG. 16.
Figure 18:
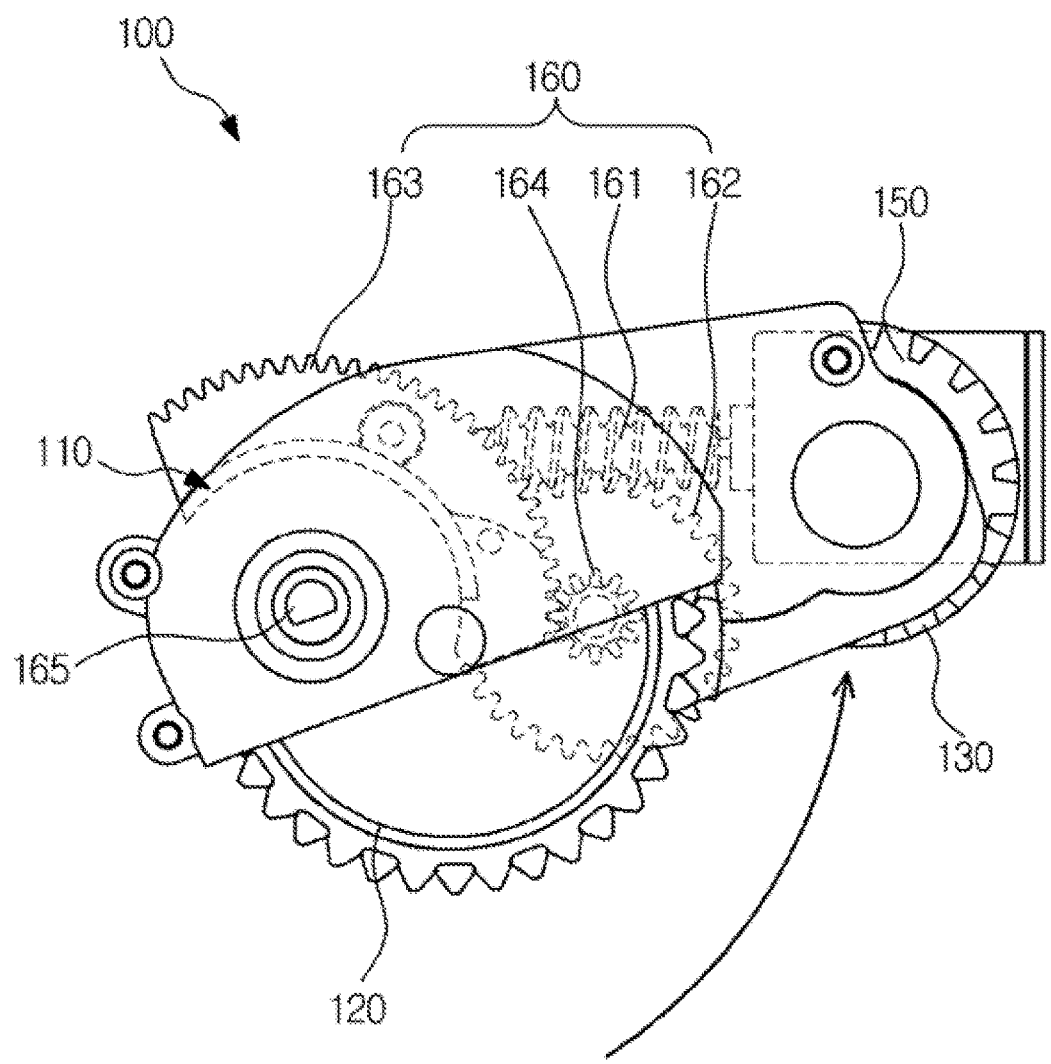
FIG. 18 is a diagram illustrating positions of a main wheel and a sub wheel illustrated in FIGS. 16 and 17 in detail.

FIG. 16 is a front view illustrating a cleaning robot in which a total height of the cleaning robot is reduced to escape from a stuck state such as a 'jammed state' according to an embodiment of the present disclosure. FIG. 17 is a side view illustrating the cleaning robot of FIG. 16. FIG. 18 is a diagram illustrating positions of a main wheel and a sub wheel illustrated in FIGS. 16 and 17 in detail.

Referring to FIGS. 16 to 18, when the cleaning robot 1 enters a narrow space of an obstacle (e.g., space under a bed or sofa), an upper portion of the cleaning robot 1 is jammed to cause the traveling-impossible stuck state. When the upper portion of the cleaning robot 1 is jammed, the main wheel 120 is restricted to cause a restriction state of the driving motor 140 which is detected by the encoder 211. In the struck state, even though the driving frame 110 is tilted downward to change the position of the sub wheel 130, the driving frame 10 cannot move. Accordingly, overcurrent flows through the tilting motor 150 and is detected by the current sensor 214 to determine the "jammed state".

In this case, the driving frame 110 is tilted upward to reduce a total height of the main wheel 120. When the driving frame 110 is raised, the main wheel 120 is deviated from the rotation shaft and raised toward the inside of the cleaning robot 1, thereby reducing the total height of the cleaning robot 1. Here, the total height of the cleaning robot 1 is reduced by up to 3.5 mm, so that a height H3 between the bottom surface of the cleaning robot 1 and the floor is 6.5 mm (lowest ride height).

The cleaning robot 1 escapes from the stuck state by restoring driving force by reducing the total height of the cleaning robot 1 and traveling in a direction opposite to the entered direction.

Figure 19:
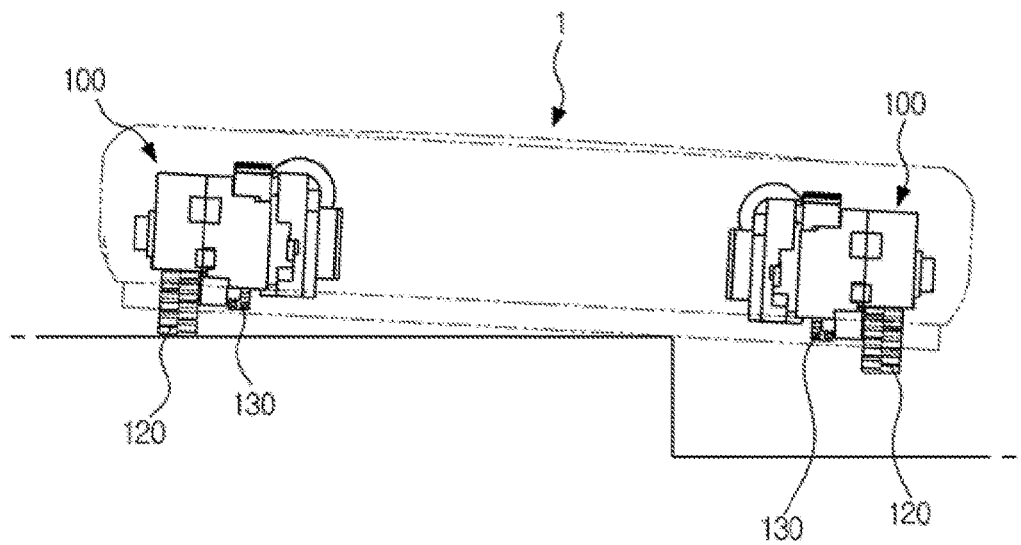
FIG. 19 is a diagram illustrating a stuck state in which a cleaning robot gets stuck on a step according to one embodiment of the present disclosure.
Figure 20:
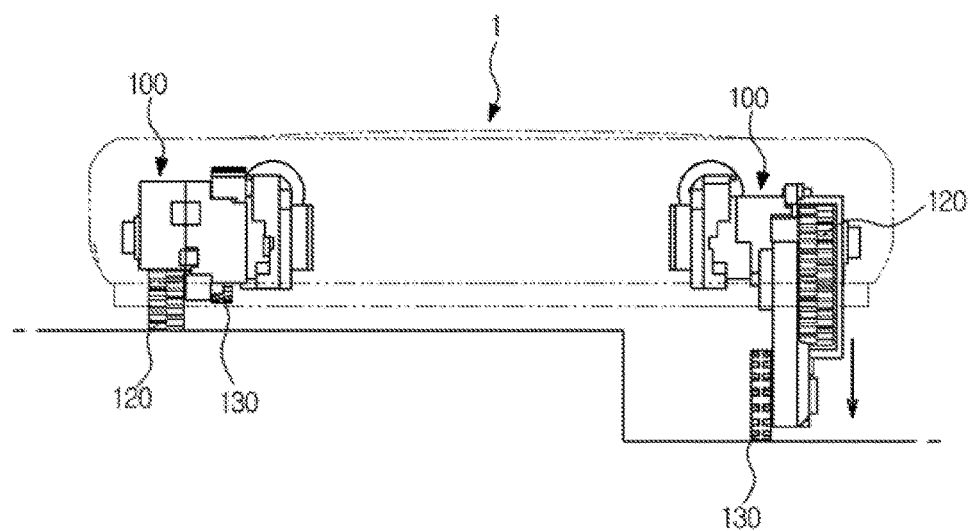
FIG. 20 is a diagram illustrating the cleaning robot of FIG. 19 in which a sub wheel protrudes downward to escape from a stuck state.

FIG. 19 is a diagram illustrating a stuck state in which a cleaning robot gets stuck at a step according to an embodiment of the present disclosure. FIG. 20 is a diagram illustrating the cleaning robot of FIG. 19 in which a sub wheel protrudes downward to escape from a stuck state.

Referring to FIGS. 19 and 20, when the cleaning robot 1 gets stuck at a step, and the main wheel 120 is lifted, driving force is restored by protruding the sub wheel 130 downward such that the sub wheel 130 contacts the floor surface of the region to be cleaned.

Figure 21:
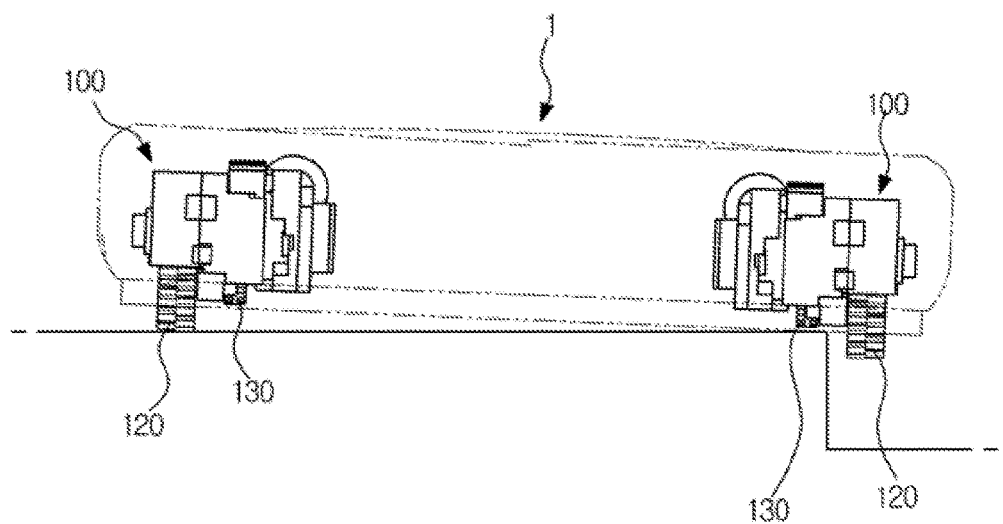
FIG. 21 is a diagram illustrating another stuck state in which a cleaning robot gets stuck on a step according to one embodiment of the present disclosure.
Figure 22:
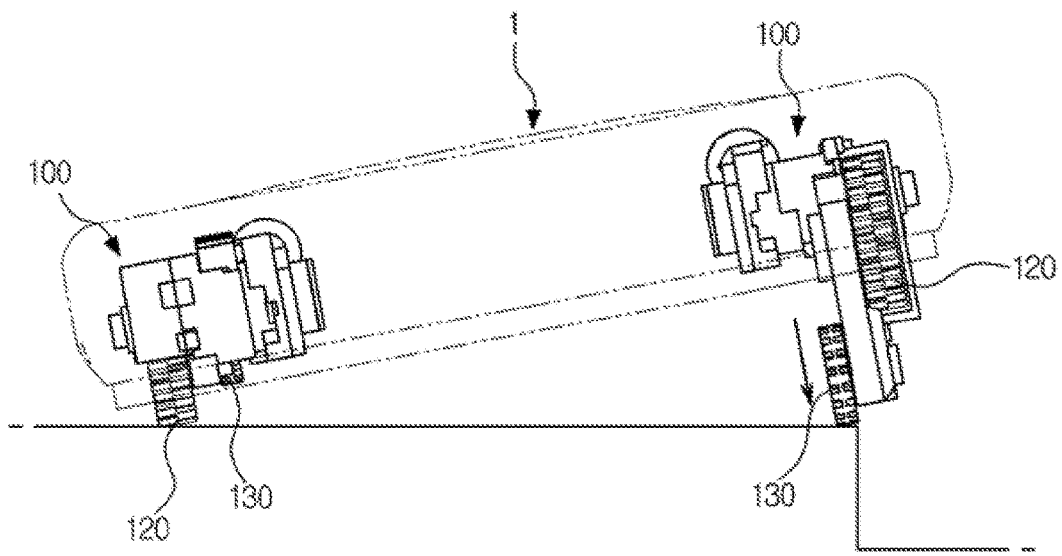
FIG. 22 is a diagram illustrating the cleaning robot of FIG. 21 in which a sub wheel protrudes downward to escape from a stuck state.

FIG. 21 is a diagram illustrating another stuck state in which a cleaning robot gets stuck at a step according to an embodiment of the present disclosure. FIG. 22 is a diagram illustrating the cleaning robot of FIG. 21 in which a sub wheel protrudes downward to escape from a stuck state.

Referring to FIGS. 21 and 22, when the cleaning robot 1 gets stuck at a step, and the main wheel 120 is lifted, driving force is restored by protruding the sub wheel 130 downward such that the sub wheel 130 contacts the floor surface of the region to be cleaned. Although the sub wheel 130 is protruded to a maximum length in the drawings, the cleaning robot 1 may escape from the struck state by protruding the sub wheel 130 to an angle sufficient to contact the floor as described above.

Hereinafter, a method of predicting a degree of risk and a type of the stuck state before the cleaning robot 1 gets into the stuck state so as to deal with the stuck state in advance will be described with reference to FIGS. 23 to 27.

Figure 23:
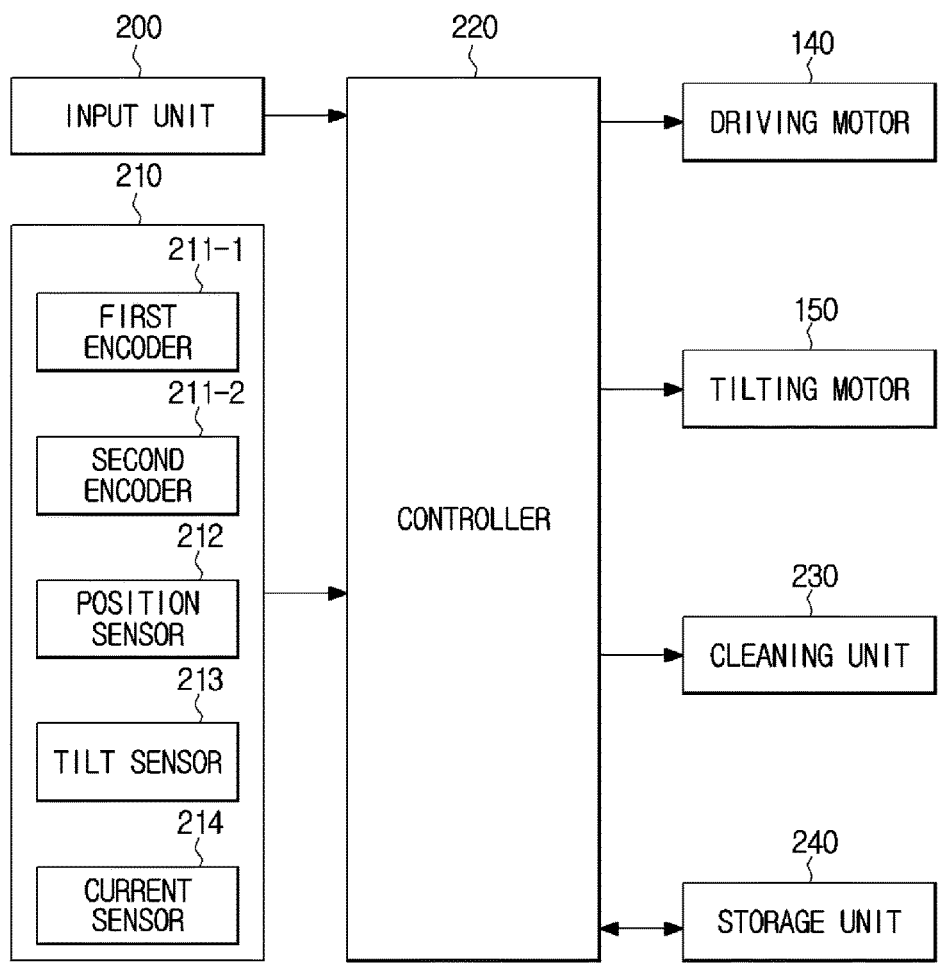
FIG. 23 is a control block diagram for predicting a stuck state in a cleaning robot according to the other embodiment of the present disclosure.

FIG. 23 is a control block diagram for predicting a stuck state in a cleaning robot 1 according to the other embodiment of the present disclosure, and the same reference numerals and the same terms are given to the same components as components described with reference to FIG. 8 and descriptions thereof are omitted.

Referring to FIG. 23, the cleaning robot 1 according to another embodiment of the present disclosure further includes an input unit 200 to receive a motion instruction from a user, a sensor unit 210 to detect a variety of information regarding a region to be cleaned where the cleaning robot 1 travels, a controller 220 that detects a degree of risk and a type of the stuck state according to the motion instruction of the input unit 200 and sensor information of the sensor unit 210 and controls to escape from the stuck state, a driving motor 140 to drive the main wheel 120 and the sub wheel 130 in accordance with a driving instruction from the controller 220, and a tilting motor 150 to change a position of the sub wheel 130 in accordance with an escape instruction from the controller 220.

The input unit 200 includes a plurality of buttons on an upper portion of the main body 10 or a remote control (not shown) to receive a motion instruction or a cleaning instruction for the cleaning robot 1 from the user and transmit the input information to the controller 220.

The sensor unit 210 may include a first encoder 211-1 and a second encoder 211-2 to measure an amount of movement of the driving motor 140 that is rotated in accordance with the motion instruction from the user, a position sensor 212 to measure a distance the cleaning robot 1 has actually moved, a tilt sensor 213 to measure an angle (direction) the cleaning robot 1 has actually moved, and a current sensor 214 to measure current flowing through the tilting motor 150.

The first and second encoders 211-1 and 211-2 are respectively mounted on the driving motors 140 of both drive units 100 installed at opposite sides of the main body 10 and predict the degree of risk and type of the stuck state of the cleaning robot 1, thereby detecting whether a main wheel 120 is pressed or jammed.

In this regard, the first encoder 211-1 is mounted on the left driving motor 140, and the second encoder 211-2 is mounted on the right driving motor 140.

The position sensor 212 is configured to measure an amount of actual movement of the cleaning robot 1. An optical flow sensor may be used in the absence of light or even when there are no features on ceilings.

The tilt sensor 213, which is a sensor module capable of measuring an angle (inclination) of the cleaning robot 1, predicts the degree of risk and type of the stuck state by measuring angle value (inclination value) and a variation of the angle value (inclination value) of the cleaning robot 1.

The current sensor 214 is installed at a power circuit to measure a load (torque or current value) applied to the tilting motor 150 and transmit the measured load to the controller 220.

The controller 220, which controls overall operation of the cleaning robot 1, predicts that the cleaning robot 1 may get into the stuck state based on sensor information received from the first and second encoders 211-1 and 211-2 and the tilt sensor 213 and robot instructions/information regarding surroundings obtained for a predetermined time period.

That is, the controller 220 judges the stuck state of the cleaning robot 1 by using the angle value which is an angle the cleaning robot 1 has moved calculated in accordance with the measurements of the first and second encoders 211-1 and 211-2 and an angle value which is an angle the cleaning robot 1 has moved measured in accordance with sensor information of the tilt sensor 213.

In other words, the controller 220 calculates the angle the cleaning robot 1 has moved in accordance with the measurements of the first and second encoders 211-1 and 211-2, measures the angle the cleaning robot 1 has moved in accordance with the sensor information of the tilt sensor 213, and judges the stuck state of the cleaning robot 1 by using a difference between the calculated angle of the cleaning robot 1 and the measured angle of the cleaning robot 1.

In addition, the controller 220 judges the stuck state of the cleaning robot 1 by detecting the difference between the calculated angle of the cleaning robot 1 and the measured angle of the cleaning robot 1 for a predetermined time period.

Besides, the controller 220 may predict the degree of risk and type of the stuck state before the cleaning robot 1 gets stuck to deal with the stuck state in advance. A method of predicting the degree of risk and type of the stuck state will be described in more detail with reference to FIGS. 28 to 33.

In addition, the controller 220 may rapidly decelerate or quickly stop the cleaning robot 1 according to the predicted degree of risk of the stuck state enabling the cleaning robot 1 to escape from the risk of the stuck state and may provide information to select a method suitable for escaping from the stuck state according to the predicted type of the stuck state, so that the degree of risk and type of the stuck state may be efficiently dealt with.

The cleaning unit 230 drives the main and side brushes to perform cleaning operation by sucking up foreign substances such as dust from the floor of the region to be cleaned where the cleaning robot 1 travels in accordance with the driving instruction from the controller 220.

The storage unit 240 stores a traveling pattern and a traveling path pre-defined according to the cleaning instruction for the cleaning robot 1 and sensor information detected while the cleaning robot 1 travels.

Figure 24:
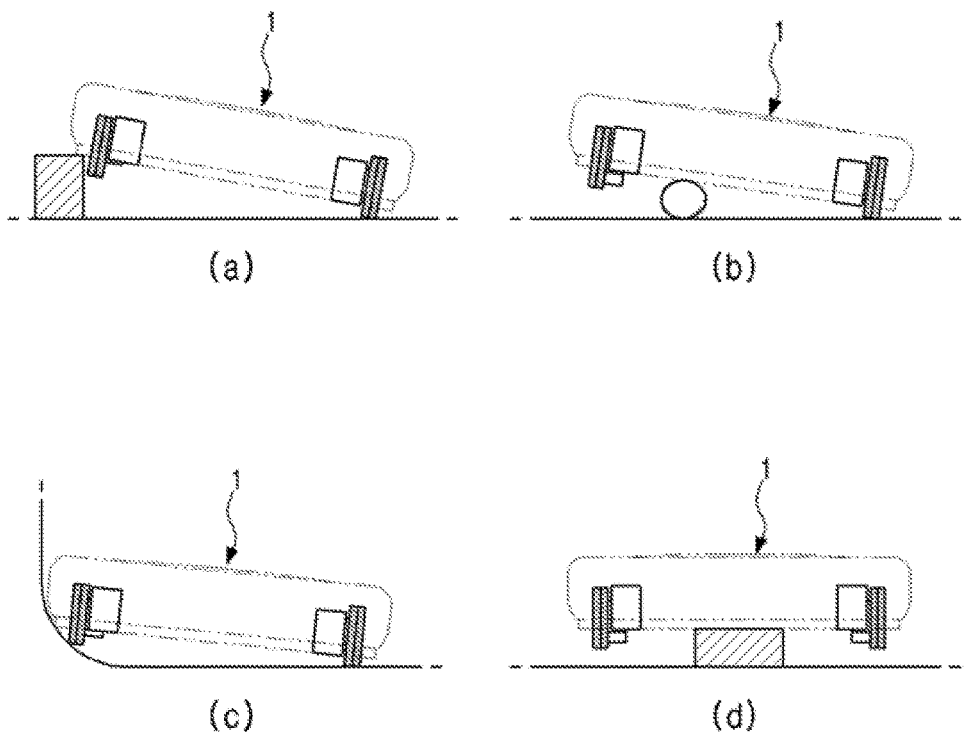
FIG. 24, parts (a)-(d), illustrates 'lifted states' of a cleaning robot according to the other embodiment of the present disclosure.

FIGS. 24 to 26 illustrate various stuck states of a cleaning robot 1 according to the other embodiment of the present disclosure.

Stuck states often occurring in the cleaning robot 1 include traveling-related three states as follows.

First, a 'lifted state' is a traveling-impossible state since the bottom surface of the cleaning robot 1 is caught by a structure or door threshold or a traveling-impossible state due to friction between the bottom surface of the cleaning robot 1 and the floor since all suspensions of wheels are lifted and the bottom surface of the cleaning robot 1 contacts the floor.

Second, a 'jammed state" of an upper portion is a state in which a front portion or a side portion of the cleaning robot 1 is jammed in a gap with a low height.

Third, an 'object-caught state' is a state in which the cleaning robot 1 climbs on a soft object (such as, bedclothes or clothes to be washed) or is caught by a pile of clothes while traveling.

FIG. 24, parts (a)-(d), illustrates 'lifted states' of the cleaning robot 1 according to the other embodiment of the present disclosure.

Referring to FIG. 24, parts (a)-(d), the 'lifted states' of the cleaning robot 1 may be classified into the following four cases.

FIG. 24, part (a), illustrates a traveling-impossible state since an outer portion of the main wheel 120 of the cleaning robot 1 climbs on an object. FIG. 24, part (b), illustrates a traveling-impossible state since an object gets stuck in the bottom surface of the cleaning robot 1. FIG. 24, part (c), illustrates a traveling-impossible state since the cleaning robot 1 climbs on an inclined object. FIG. 24, part (d), illustrates a traveling-impossible state since the entire bottom surface of the cleaning robot 1 is mounted on an object.

FIG. 25, parts (a) and (b), illustrates 'jammed states' of the cleaning robot 1 according to the other embodiment of the present disclosure.

FIG. 25, part (a), illustrates a state in which a side portion of the cleaning robot 1 is jammed in a narrow space (such as space under a bed or sofa. FIG. 25, part (b), illustrates a state in which a front portion of the cleaning robot 1 is jammed in the narrow space.

Referring to FIG. 25, parts (a) and (b), the 'jammed state' of the upper portion of the cleaning robot 1 is a state in which a front portion or side portion of the cleaning robot 1 enters into the narrow space and cannot escape from the narrow space since the entire or a portion of the bottom surface of the cleaning robot 1 contact the floor. The 'jammed state' occurs since a sensor does not operate until the cleaning robot 1 is jammed in the narrow space.

FIG. 26, parts (a) and (b), illustrates 'object-caught states' of the cleaning robot 1 according to the other embodiment of the present disclosure.

FIG. 26, part (a), illustrates a state in which the cleaning robot 1 climbs on a soft object (such as bedclothes or clothes to be washed) while traveling. FIG. 26, part (b), illustrates a state in which the cleaning robot 1 is caught by a soft object (such as a pile of clothes) while traveling.

In order to deal with the stuck states as illustrated in FIGS. 24 to 26 in advance, the risk of the stuck state needs to be predicted. The predicting of the risk of the stuck state refers to detecting a low risk state or high risk state in which a stuck state easily occurs although the cleaning robot 1 is not in a real stuck state. A pre-detection is performed by using the first and second encoders 211-1 and 211-2 attached to the left and right side driving motors 140 and the tilt sensor 213. In this regard, variations measured by the first and second encoders 211-1 and 211-2 and the tilt sensor 213 are used to perform the pre-detection of the stuck state. The pre-detection is performed after checking the variations for a predetermined time period.

Figure 27:
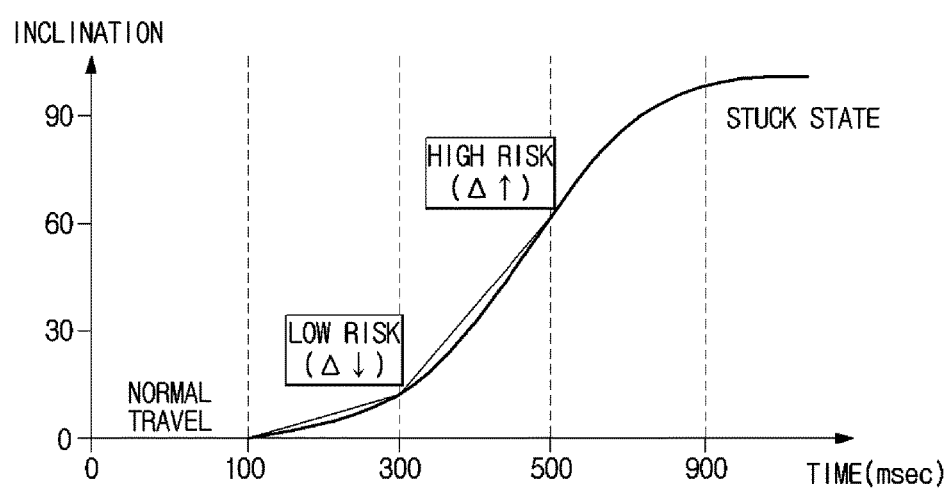
FIG. 27 is a graph illustrating the degrees of risk of getting into the stuck state in the cleaning robot according to the other embodiment of the present disclosure.

FIG. 27 is a graph illustrating the degrees of risk of getting into the stuck state in the cleaning robot 1 according to the other embodiment of the present disclosure. The risk of the stuck state may be predicted before the cleaning robot 1 gets stuck in the stuck state by using the inclination value and a variation of the inclination value measured by the tilt sensor 213.

In FIG. 27, the degree of risk used to predict the stuck state of the cleaning robot 1 has two stages. That is, the cleaning robot 1 has two stages of the degree of risk of getting stuck, i.e., a low risk and a high risk. At a low risk of getting stuck, the cleaning robot 1 escapes from the low risk state via a rapid deceleration of a traveling speed. At a high risk of getting stuck, the cleaning robot 1 escapes from the high risk state via quick stopping and rotation of the main wheels 120.

Then, a method of predicting the degree of risk and type of the stuck state will be described with reference to FIGS. 28 and 33.

Figure 28:
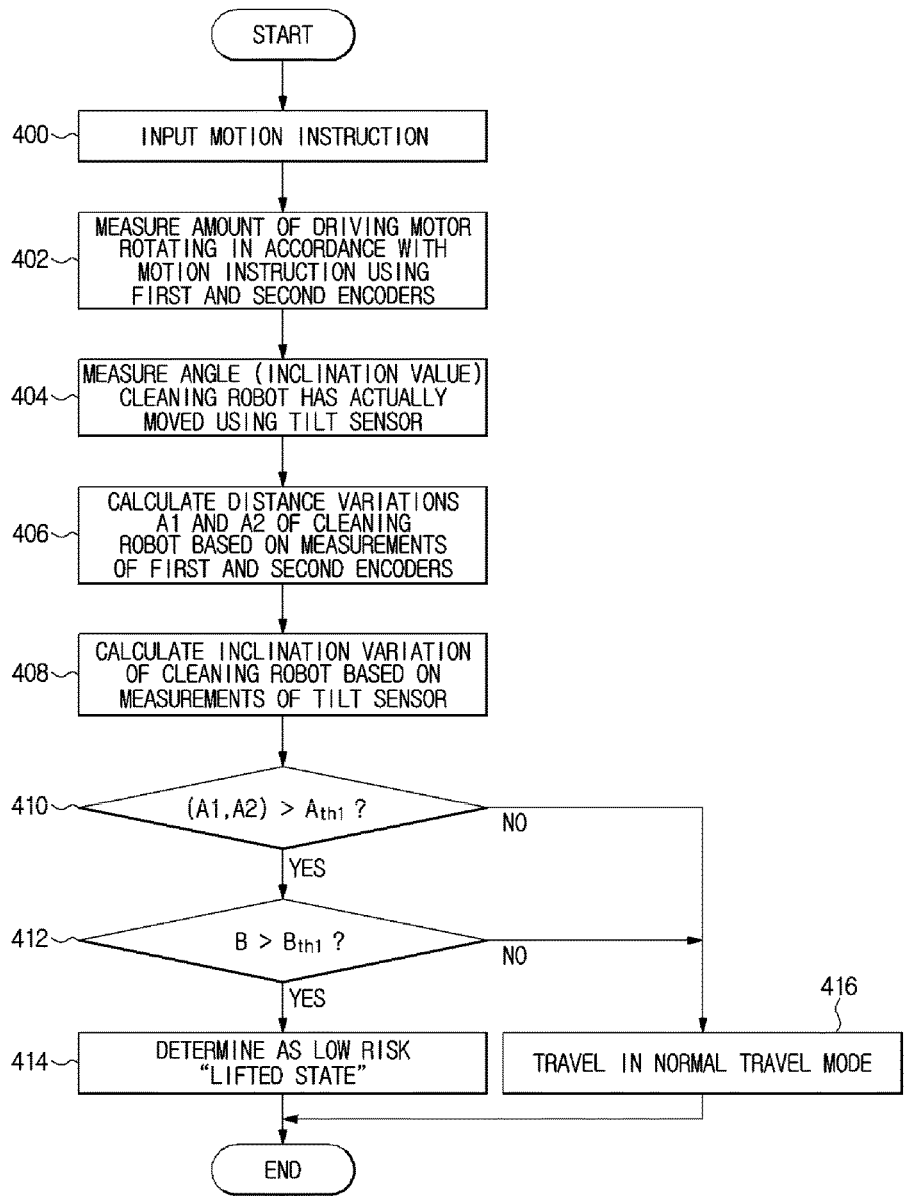
FIG. 28 is a flowchart illustrating a method of predicting a low risk 'lifted state' of a cleaning robot according to the other embodiment of the present disclosure.

FIG. 28 is a flowchart illustrating a method of predicting a low risk 'lifted state' of the cleaning robot according to the other embodiment of the present disclosure.

Referring to FIG. 28, when the user inputs the motion instruction for the cleaning robot 1 via the input unit 200 (400), the controller 220 rotates the driving motors 140 installed at opposite sides of the main body 10 in accordance with the motion instruction to rotate the main wheels 120 forward or backward (in a regular direction or in a reverse direction), such that the cleaning robot 1 travels on the floor along a predetermined travel pattern (right-angle travel pattern or random travel pattern).

As such, the first and second encoders 211-1 and 211-2 measure the amounts of movement of the left and right driving motors 140 (movement distances and movement angles of the driving motors 140) rotated in accordance with the motion instruction and transmit the measurements to the controller 220 (402).

In this regard, the tilt sensor 213 measures the angle value, i.e., inclination value, the cleaning robot 1 has actually moved and transmits the measurements to the controller 220 (404).

Accordingly, the controller 220 calculates variations in distances A1 and A2 the cleaning robot 1 has moved based on the measurements of the first and second encoders 211-1 and 211-2 (406) and calculates a variation in an angle, i.e., an inclination value, B the cleaning robot 1 has moved based on the measurements of the tilt sensor 213 (408).

Accordingly, the controller 220 determines whether at least one encoder variation A1 or A2 between the variations A1 and A2 of the first and second encoders 211-1 and 211-2 is greater than a first encoder threshold $A_{th1}$ set by the user (410).

The first encoder threshold $A_{th1}$ set by the user may be obtained through Equation 1 below.

$$A_{th1}=V+V*0.06 \text{ (sensor error)} \qquad \text{Equation 1}$$

In Equation 1, V is an average velocity of the cleaning robot 1 while moving and may be calculated through Equation 2 below.

$$V=n_k \times 2\pi \cdot r/n_0 \text{ [rad/sec]} \qquad \text{Equation 2}$$

In Equation 2, $n_k$ is the number of pulses of the first and second encoders 211-1 and 211-2, r is a radius of the main wheel 120, and $n_0$ is the number of pulses of the first and second encoders 211-1 and 211-2 after one turn of the wheel.

Upon determination in operation 410, when the at least one encoder variation A1 or A2 is greater than the first encoder threshold $A_{th1}$, the controller 220 determines whether the variation in the inclination value B measured by the tilt sensor 213 is greater than a first inclination threshold $B_{th1}$ set by the user (412).

The first inclination threshold $B_{th1}$ set by the user may be calculated by using Equation 3 below.

$$B_{th1}=\pm 3° \text{ (sensor error)} \qquad \text{Equation 3}$$

Upon determination in operation 412, when the variation in the inclination value B is greater than the first inclination threshold $B_{th1}$, the controller 220 determines that the cleaning robot 1 is in a low risk 'lifted state' (414).

In conclusion, when the at least one encoder variation A1 or A2 between the variations A1 and A2 of the first and second encoders 211-1 and 211-2 is greater than the first encoder threshold $A_{th1}$ set by the user, and the inclination value variation B is greater than the first inclination threshold $B_{th1}$ set by the user, the controller 220 gives a warning that the cleaning robot 1 is in a low risk 'lifted state'.

Then, the controller 220 rapidly decelerates the driving motors 140 to enable the cleaning robot 1 to escape from the low risk 'lifted state' and provides information to select a method suitable for escaping from the 'lifted state'.

Meanwhile, upon determination in operation 410, when the at least one encoder variation A1 or A2 is not greater than the first encoder threshold $A_{th1}$ the controller 220 controls the cleaning robot 1 to keep traveling in the normal travel mode in which the cleaning robot 1 travels on the floor by rotating the driving motors 140 (416).

In addition, upon determination in operation 412, when the variation in the inclination value B is not greater than the first inclination threshold $B_{th1}$, the controller 220 controls the cleaning robot 1 to keep traveling in the normal travel mode in which the cleaning robot 1 travels on the floor by rotating the driving motors 140 (416).

Figure 29:
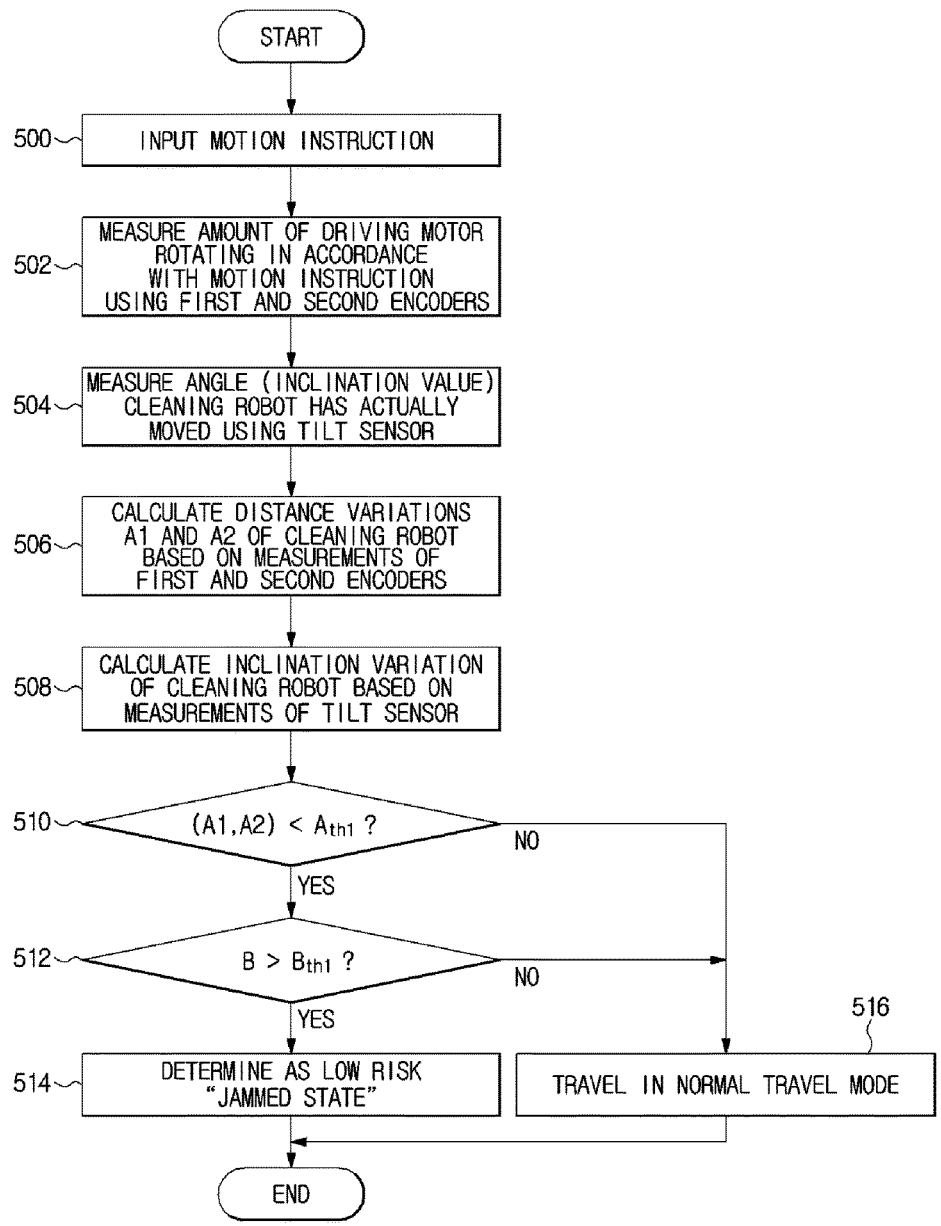
FIG. 29 is a flowchart illustrating a method of predicting a low risk upper portion 'jammed state' of a cleaning robot according to the other embodiment of the present disclosure.

FIG. 29 is a flowchart illustrating a method of predicting a low risk upper portion 'jammed state' of the cleaning robot 1 according to the other embodiment of the present disclosure.

Referring to FIG. 29, when the user inputs the motion instruction for the cleaning robot 1 via the input unit 200 (500), the controller 220 rotates the driving motors 140 installed at opposite sides of the main body 10 in accordance with the motion instruction to rotate the main wheels 120 forward or backward (in a regular direction or in a reverse direction), such that the cleaning robot 1 travels on the floor along a predetermined travel pattern (right-angle travel pattern or random travel pattern).

As such, the first and second encoders 211-1 and 211-2 measure the amounts of movement of the left and right driving motors 140 (movement distances and movement angles of the driving motors 140) rotated in accordance with the motion instruction and transmit the measurements to the controller 220 (502).

In this regard, the tilt sensor 213 measures the angle value, i.e., inclination value, the cleaning robot 1 has actually moved and transmits the measurements to the controller 220 (504).

Accordingly, the controller 220 calculates variations in distances A1 and A2 the cleaning robot 1 has moved based on the measurements of the first and second encoders 211-1 and 211-2 (506) and calculates a variation in an angle, i.e., an inclination value, B the cleaning robot 1 has moved based on the measurements of the tilt sensor 213 (508).

Accordingly, the controller 220 determines whether at least one encoder variation A1 or A2 between the variations A1 and A2 of the first and second encoders 211-1 and 211-2 is greater than a first encoder threshold $A_{th1}$ set by the user (510).

Upon determination in operation 510, when the at least one encoder variation A1 or A2 is less than the first encoder threshold $A_{th1}$, the controller 220 determines whether the variation in the inclination value B measured by the tilt sensor 213 is greater than a first inclination threshold $B_{th1}$ set by the user (512).

Upon determination in operation 512, when the variation in the inclination value B is greater than the first inclination threshold $B_{th1}$, the controller 220 determines that the cleaning robot 1 is in a low risk upper portion 'jammed state' (514).

In conclusion, when the at least one encoder variation A1 or A2 between the variations A1 and A2 of the first and second encoders 211-1 and 211-2 is less than the first encoder threshold $A_{th1}$ set by the user, and the inclination value variation B is greater than the first inclination threshold $B_{th1}$ set by the user, the controller 220 gives a warning that the cleaning robot 1 is in a low risk upper portion 'jammed state'.

Then, the controller 220 rapidly decelerates the driving motors 140 to enable the cleaning robot 1 to escape from the low risk upper portion 'jammed state' and provides information to select a method suitable for escaping from the upper portion 'jammed state'.

Meanwhile, upon determination in operation 510, when the at least one encoder variation A1 or A2 is not less than the first encoder threshold $A_{th1}$, the controller 220 controls the cleaning robot 1 to keep traveling in the normal travel mode in which the cleaning robot 1 travels on the floor by rotating the driving motors 140 (516).

In addition, upon determination in operation 512, when the variation in the inclination value B is not greater than the first inclination threshold $B_{th1}$, the controller 220 controls the cleaning robot 1 to keep traveling in the normal travel mode in which the cleaning robot 1 travels on the floor by rotating the driving motors 140 (516).

Figure 30:
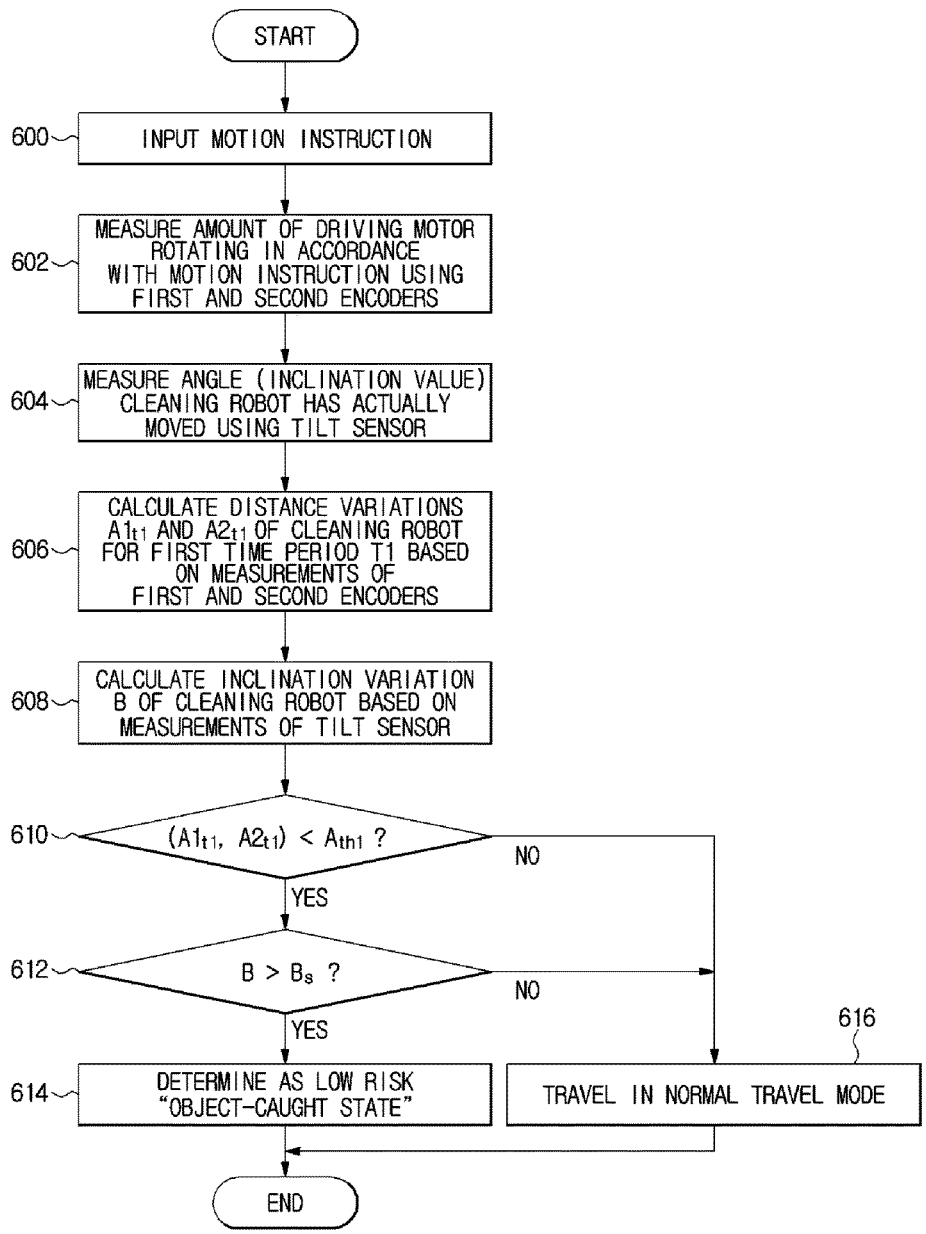
FIG. 30 is a flowchart illustrating a method of predicting a low risk "object-caught state' of a cleaning robot according to the other embodiment of the present disclosure.

FIG. 30 is a flowchart illustrating a method of predicting a low risk "object-caught state' of the cleaning robot 1 according to the other embodiment of the present disclosure.

Referring to FIG. 30, when the user inputs the motion instruction for the cleaning robot 1 via the input unit 200 (600), the controller 220 rotates the driving motors 140 installed at opposite sides of the main body 10 in accordance with the motion instruction to rotate the main wheels 120 forward or backward (in a regular direction or in a reverse direction), such that the cleaning robot 1 travels on the floor along a predetermined travel pattern (right-angle travel pattern or random travel pattern).

As such, the first and second encoders 211-1 and 211-2 measure the amounts of movement of the left and right driving motors 140 (movement distances and movement angles of the driving motors 140) rotated in accordance with the motion instruction and transmit the measurements to the controller 220 (602).

In this regard, the tilt sensor 213 measures the angle value, i.e., inclination value, the cleaning robot 1 has actually moved and transmits the measurements to the controller 220 (604).

Accordingly, the controller 220 calculates variations in angles $A1_{t1}$ and $A2_{t1}$ the cleaning robot 1 has moved based on the measurements of the first and second encoders 211-1 and 211-2 (606) and calculates a variation in an angle, i.e., an inclination value, B the cleaning robot 1 has moved based on the measurements of the tilt sensor 213 (608).

Accordingly, the controller 220 determines whether at least one encoder variation $A1_{t1}$ or $A2_{t1}$ between the variations $A1_{t1}$ and $A2_{t1}$ of the first and second encoders 211-1 and 211-2 measured during a first time period t1 is less than a first encoder threshold $A_{th1}$ set by the user (610).

Upon determination in operation 610, when the at least one encoder variation $A1_{t1}$ or $A2_{t1}$ is less than the first encoder threshold $A_{th1}$, the controller 220 determines whether the variation in the inclination value B measured by the tilt sensor 213 is greater than a reference threshold $B_s$ of the upper portion jammed state (612).

Upon determination in operation 612, when the variation in the inclination value B is greater than the reference threshold $B_s$ of the upper portion jammed state, the controller 220 determines that the cleaning robot 1 is in a low risk 'object-caught state' (614).

In conclusion, when the at least one encoder variation $A1_{t1}$ or $A2_{t1}$ between the variations $A1_{t1}$ and $A2_{t1}$ of the first and second encoders 211-1 and 211-2 measured by frequency checking during the first time period t1 is less than the first encoder threshold $A_{th1}$ set by the user, and the inclination value variation B is greater than the reference threshold $B_s$ of the upper portion jammed state, the controller 220 gives a warning that the cleaning robot 1 is in a low risk 'object-caught state'.

Then, the controller 220 rapidly decelerates the driving motors 140 to enable the cleaning robot 1 to escape from the low risk 'object-caught state' and provides information to select a method suitable for escaping from the 'object-caught state'.

Meanwhile, upon determination in operation 610, when the at least one encoder variation $A1_{t1}$ or $A2_{t1}$ between the variations $A1_{t1}$ and $A2_{t1}$ of the first and second encoders 211-1 and 211-2 measured by frequency checking during the first time period t1 is not less than the first encoder threshold $A_{th1}$ set by the user, the controller 220 controls the cleaning robot 1 to keep traveling in the normal travel mode in which the cleaning robot 1 travels on the floor by rotating the driving motors 140 (616).

In addition, upon determination in operation 612, when the variation in the inclination value B is not greater than the reference threshold $B_s$ of the upper portion jammed state, the controller 220 controls the cleaning robot 1 to keep traveling in the normal travel mode in which the cleaning robot 1 travels on the floor by rotating the driving motors 140 (616).

Figure 31:
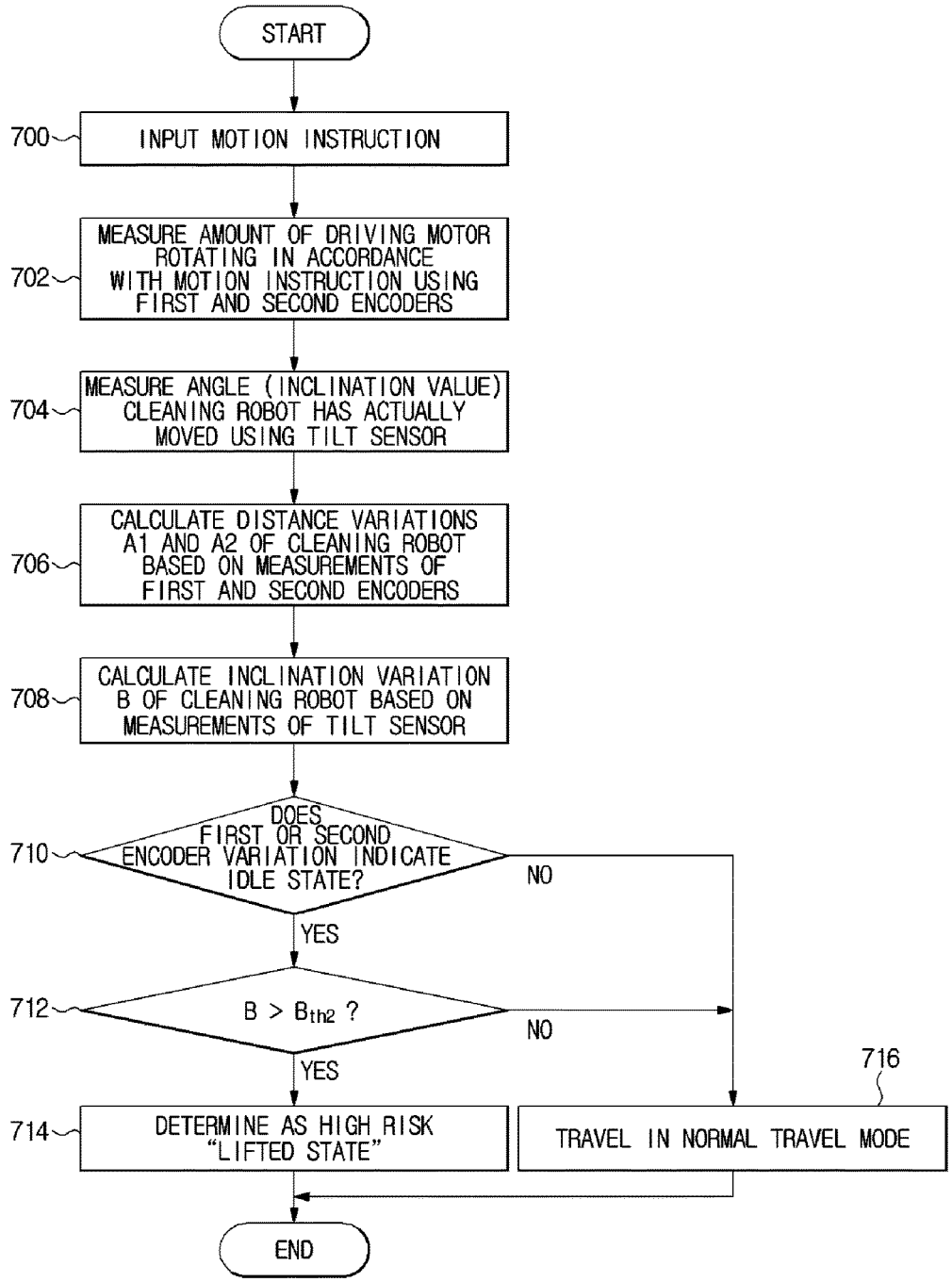
FIG. 31 is a flowchart illustrating a method of predicting a high risk "lifted state' of a cleaning robot according to the other embodiment of the present disclosure.

FIG. 31 is a flowchart illustrating a method of predicting a high risk "lifted state' of the cleaning robot 1 according to the other embodiment of the present disclosure.

Referring to FIG. 31, when the user inputs the motion instruction for the cleaning robot 1 via the input unit 200 (700), the controller 220 rotates the driving motors 140 installed at opposite sides of the main body 10 in accordance with the motion instruction to rotate the main wheels 120 forward or backward (in a regular direction or in a reverse direction), such that the cleaning robot 1 travels on the floor along a predetermined travel pattern (right-angle travel pattern or random travel pattern).

As such, the first and second encoders 211-1 and 211-2 measure the amounts of movement of the left and right driving motors 140 (movement distances and movement angles of the driving motors 140) rotated in accordance with the motion instruction and transmit the measurements to the controller 220 (702).

In this regard, the tilt sensor 213 measures the angle value, i.e., inclination value, the cleaning robot 1 has actually moved and transmits the measurements to the controller 220 (704).

Accordingly, the controller 220 calculates variations in distances A1 and A2 the cleaning robot 1 has moved based on the measurements of the first and second encoders 211-1 and 211-2 (706) and calculates a variation in an angle, i.e., an inclination value, B the cleaning robot 1 has moved based on the measurements of the tilt sensor 213 (708).

Accordingly, the controller 220 determines whether at least one encoder variation A1 or A2 between the variations A1 and A2 of the first and second encoders 211-1 and 211-2 indicates an idle state, in which the main wheels 120 are running idle, (open state) (710).

Upon determination in operation 710, when the at least one encoder variation A1 or A2 indicates the idle state, the controller 220 determines whether the variation in the inclination value B measured by the tilt sensor 213 is greater than a second inclination threshold $B_{th2}$ set by the user (712).

The second inclination threshold $B_{th2}$ set by the user is may be calculated by using Equation 4 below.

$$B_{th2} = \tan-1(2r/h) \qquad \text{Equation 4}$$

In Equation 4, r is a radius of the main wheel 120 and h is a ride height of the cleaning robot 1.

Upon determination in operation 712, when the variation in the inclination value B is greater than the second inclination threshold $B_{th2}$, the controller 220 determines that the cleaning robot 1 is in a high risk 'lifted state' (714).

In conclusion, when the at least one encoder variation A1 or A2 between the variations A1 and A2 of the first and second encoders 211-1 and 211-2 indicates an idle state, and the inclination value variation B is greater than the second inclination threshold $B_{th2}$ set by the user, the controller 220 gives a warning that the cleaning robot 1 is in a high risk 'lifted state'.

Then, the controller 220 rapidly decelerates the driving motors 140 to enable the cleaning robot 1 to escape from the high risk 'lifted state' and provides information to select a method suitable for escaping from the 'lifted state'.

Meanwhile, upon determination in operation 710, when the at least one encoder variation A1 or A2 does not indicate the idle state, the controller 220 controls the cleaning robot 1 to keep traveling in the normal travel mode in which the cleaning robot 1 travels on the floor by rotating the driving motors 140 (716).

In addition, upon determination in operation 712, when the variation in the inclination value B is not greater than the second inclination threshold $B_{th2}$, the controller 220 controls the cleaning robot 1 to keep traveling in the normal travel mode in which the cleaning robot 1 travels on the floor by rotating the driving motors 140 (716).

Figure 32:
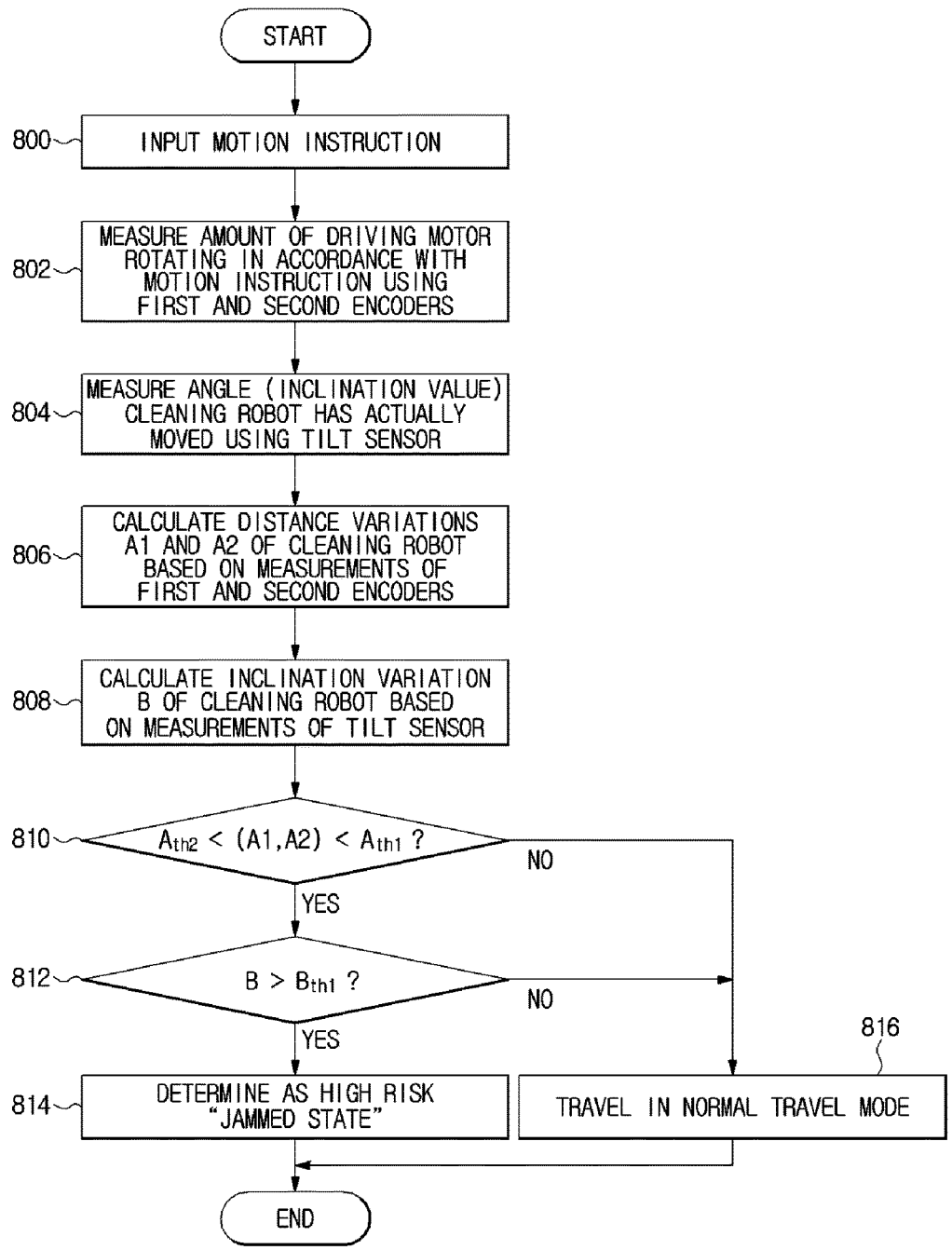
FIG. 32 is a flowchart illustrating a method of predicting a high risk upper portion 'jammed state' of a cleaning robot according to the other embodiment of the present disclosure.

FIG. 32 is a flowchart illustrating a method of predicting a high risk upper portion 'jammed state' of the cleaning robot 1 according to the other embodiment of the present disclosure.

Referring to FIG. 32, when the user inputs the motion instruction for the cleaning robot 1 via the input unit 200 (800), the controller 220 rotates the driving motors 140 installed at opposite sides of the main body 10 in accordance with the motion instruction to rotate the main wheels 120 forward or backward (in a regular direction or in a reverse direction), such that the cleaning robot 1 travels on the floor along a predetermined travel pattern (right-angle travel pattern or random travel pattern).

As such, the first and second encoders 211-1 and 211-2 measure the amounts of movement of the left and right driving motors 140 (movement distances and movement angles of the driving motors 140) rotated in accordance with the motion instruction and transmit the measurements to the controller 220 (802).

In this regard, the tilt sensor 213 measures the angle value, i.e., inclination value, the cleaning robot 1 has actually moved and transmits the measurements to the controller 220 (804).

Accordingly, the controller 220 calculates variations in distances A1 and A2 the cleaning robot 1 has moved based on the measurements of the first and second encoders 211-1 and 211-2 (806) and calculates a variation in an angle, i.e., an inclination value, B the cleaning robot 1 has moved based on the measurements of the tilt sensor 213 (808).

Accordingly, the controller 220 determines whether at least one encoder variation A1 or A2 between the variations A1 and A2 of the first and second encoders 211-1 and 211-2 is less than the first encoder threshold $A_{th1}$ set by the user and greater than the second encoder threshold $A_{th2}$ set by the user (810).

The second encoder threshold $A_{th2}$ set by the user may be calculated by using Equation 5 below.

$$A_{th2} = 0 + V^{*}0.06 \text{ (sensor error)} \qquad \text{Equation 5}$$

In Equation 5, 0 is a velocity of the cleaning robot 1 in the stuck state and V is an average velocity of the cleaning robot 1 while moving.

Upon determination in operation 810, when the at least one encoder variation A1 or A2 is less than the first encoder threshold $A_{th1}$ and greater than the second encoder threshold $A_{th2}$, the controller 220 determines whether the variation in the inclination value B measured by the tilt sensor 213 is greater than the first inclination threshold $B_{th1}$ set by the user (812).

Upon determination in operation 812, when the variation in the inclination value B is greater than the first inclination threshold $B_{th1}$, the controller 220 determines that the cleaning robot 1 is in a high risk upper portion 'jammed state' (814).

In conclusion, when the at least one encoder variation A1 or A2 between the variations A1 and A2 of the first and second encoders 211-1 and 211-2 is less than the first encoder threshold $A_{th1}$ set by the user and greater than the second encoder threshold $A_{th2}$, and the inclination value variation B is greater than the first inclination threshold $B_{th1}$ set by the user, the controller 220 gives a warning that the cleaning robot 1 is in a high risk upper portion 'jammed state'.

Then, the controller 220 rapidly decelerates the driving motors 140 to enable the cleaning robot 1 to escape from the high risk upper portion 'jammed state' and provides information to select a method suitable for escaping from the upper portion 'jammed state'.

Meanwhile, upon determination in operation 810, when the at least one encoder variation A1 or A2 is less than the first encoder threshold $A_{th1}$ and is not greater than the second encoder threshold $A_{th2}$, the controller 220 controls the cleaning robot 1 to keep traveling in the normal travel mode in which the cleaning robot 1 travels on the floor by rotating the driving motors 140 (816).

In addition, upon determination in operation 812, when the variation in the inclination value B is not greater than the first inclination threshold $B_{th1}$, the controller 220 controls the cleaning robot 1 to keep traveling in the normal travel mode in which the cleaning robot 1 travels on the floor by rotating the driving motors 140 (816).

Figure 33:
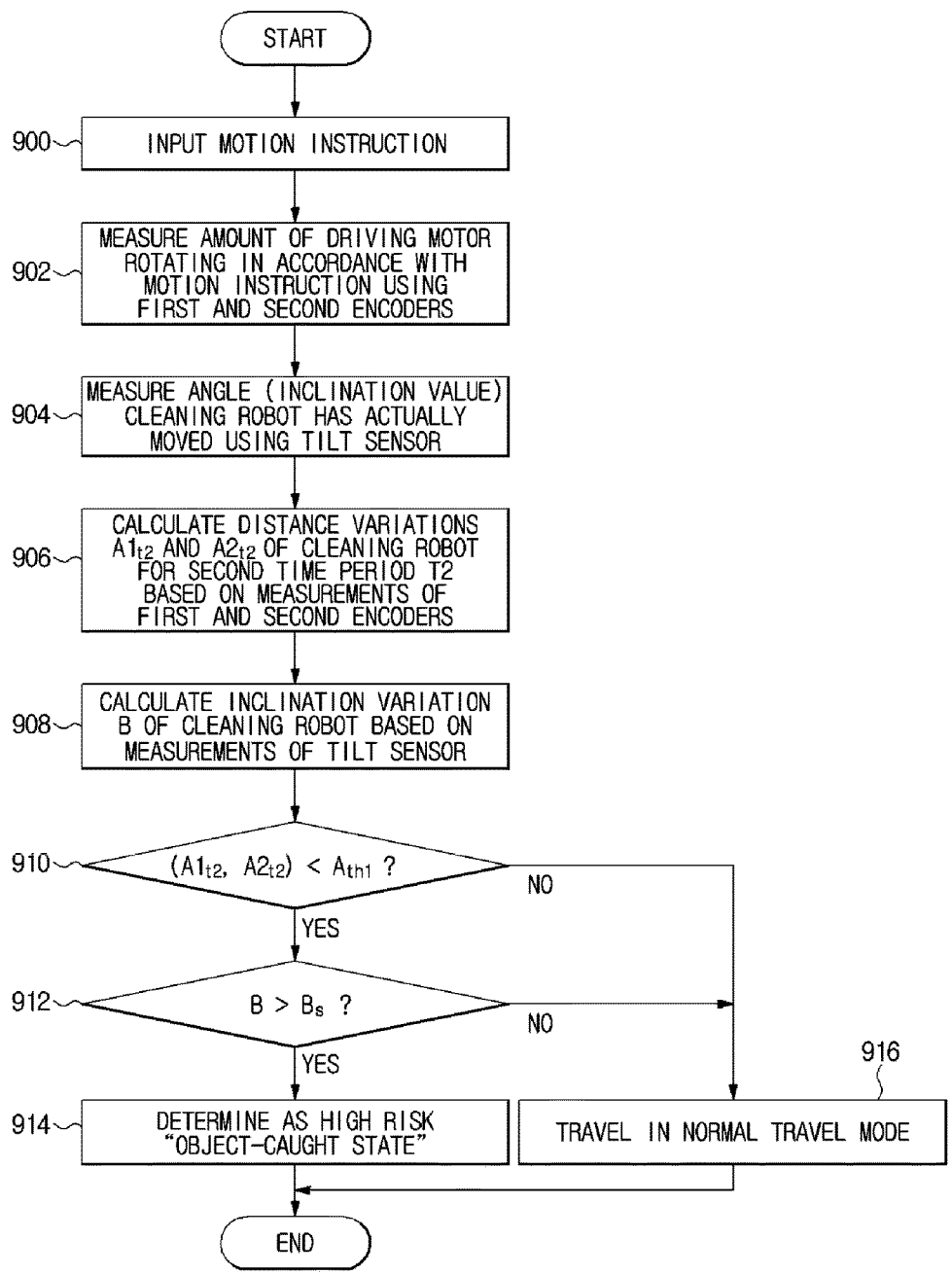
FIG. 33 is a flowchart illustrating a method of predicting a high risk "object-caught state' of a cleaning robot according to the other embodiment of the present disclosure.

FIG. 33 is a flowchart illustrating a method of predicting a high risk "object-caught state' of the cleaning robot 1 according to the other embodiment of the present disclosure.

Referring to FIG. 33, when the user inputs the motion instruction for the cleaning robot 1 via the input unit 200 (900), the controller 220 rotates the driving motors 140 installed at opposite sides of the main body 10 in accordance with the motion instruction to rotate the main wheels 120 forward or backward (in a regular direction or in a reverse direction), such that the cleaning robot 1 travels on the floor along a predetermined travel pattern (right-angle travel pattern or random travel pattern).

As such, the first and second encoders 211-1 and 211-2 measure the amounts of movement of the left and right driving motors 140 (movement distances and movement angles of the driving motors 140) rotated in accordance with the motion instruction and transmit the measurements to the controller 220 (902).

In this regard, the tilt sensor 213 measures the angle value, i.e., inclination value, the cleaning robot 1 has actually moved and transmits the measurements to the controller 220 (904).

Accordingly, the controller 220 calculates variations in angles $A1_{t2}$ and $A2_{t2}$ the cleaning robot 1 has moved based on the measurements of the first and second encoders 211-1 and 211-2 by frequency checking during a second time period t2 (906) and calculates a variation in an angle, i.e., an inclination value, B the cleaning robot 1 has moved based on the measurements of the tilt sensor 213 (908).

Accordingly, the controller 220 determines whether at least one encoder variation $A1_{t2}$ or $A2_{t2}$ between the variations $A1_{t2}$ and $A2_{12}$ of the first and second encoders 211-1 and 211-2 measured by frequency checking during the second time period t2 is less than the first encoder threshold $A_{th1}$ set by the user (910).

Upon determination in operation 910, when the at least one encoder variation $A1_{t2}$ or $A2_{12}$ is less than the first encoder threshold $A_{th1}$, the controller 220 determines whether the variation in the inclination value B measured by the tilt sensor 213 is greater than the reference threshold $B_s$ of the upper portion jammed state (912).

Upon determination in operation 912, when the variation in the inclination value B is greater than the reference threshold $B_s$ of the upper portion jammed state, the controller 220 determines that the cleaning robot 1 is in a high risk 'object-caught state' (914).

In conclusion, when the at least one encoder variation $A1_{t2}$ or $A2_{t2}$ between the variations $A1_{t2}$ and $A2_{t2}$ of the first and second encoders 211-1 and 211-2 measured by frequency checking during the second time period t2 is less than the first encoder threshold $A_{th1}$ set by the user, and the inclination value variation B is greater than the reference threshold $B_s$ of the upper portion jammed state, the controller 220 gives a warning that the cleaning robot 1 is in a high risk 'object-caught state'.

Since the cleaning robot 1 in the high risk 'object-caught state' has a degree of risk greater than that of the low risk 'object-caught state', the second time period t2 is set to be less than the first time period t1.

Then, the controller 220 quickly stops the driving motors 140 to enable the cleaning robot 1 to escape from the high risk 'object-caught state' and provides information to select a method suitable for escaping from the 'object-caught state'.

Meanwhile, upon determination in operation 910, when the at least one encoder variation $A1_{t2}$ or $A2_{t2}$ between the variations $A1_{t2}$ and $A2_{t2}$ of the first and second encoders 211-1 and 211-2 measured by frequency checking during the second time period t2 is not less than the first encoder threshold $A_{th1}$ set by the user, the controller 220 controls the cleaning robot 1 to keep traveling in the normal travel mode in which the cleaning robot 1 travels on the floor by rotating the driving motors 140 (916).

In addition, upon determination in operation 912, when the variation in the inclination value B is not greater than the reference threshold $B_s$ of the upper portion jammed state, the controller 220 controls the cleaning robot 1 to keep traveling in the normal travel mode in which the cleaning robot 1 travels on the floor by rotating the driving motors 140 (916).

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A cleaning robot comprising a main body and a drive unit to move the main body, further comprising:
    an input unit to input a motion instruction for the cleaning robot;
    a tilt sensor to measure an inclination of the cleaning robot moving in accordance with the input motion instruction; and
    a controller to determine a stuck state of the cleaning robot by using an angle value obtained by measuring an angle the cleaning robot has moved based on sensor information of the tilt sensor.

2. The cleaning robot according to claim 1, wherein the drive unit further comprises a left driving motor and a right driving motor to transmit driving force to left and right sides of the main body, and
    the cleaning robot further comprises a first encoder installed in the left driving motor to measure an amount of movement of the left driving motor generated by the motion instruction for the cleaning robot, and a second encoder installed in the right driving motor to measure an amount of movement of the right driving motor generated by the motion instruction for the cleaning robot.

3. The cleaning robot according to claim 2, wherein the tilt sensor is a gyro sensor to measure an inclination value the cleaning robot has actually moved.

4. The cleaning robot according to claim 3, wherein the controller calculates an angle the cleaning robot has moved based on measurements of the first encoder and the second encoder encoders, measures an angle the cleaning robot has moved based on sensor information of the tilt sensor, and determines a stuck state of the cleaning robot by using a difference between the calculated angle of the cleaning robot and the measured angle of the cleaning robot.

5. The cleaning robot according to claim 4, wherein the controller calculates first encoder and the second encoder encoder variations A1 and A2 the cleaning robot has moved based on the measurements of the first and second encoders, calculates an inclination value variation B the cleaning robot has moved based on the sensor information of the tilt sensor, and determines a degree of risk and type of the stuck state of the cleaning robot by using the calculated first and second encoder variations A1 and A2 and the calculated inclination value variation B.

6. The cleaning robot according to claim 5, wherein the controller determines that the cleaning robot is in a low risk 'lifted stated' when at least one of the first and second encoder variations A1 and A2 is greater than a first encoder threshold ($A_{th1}$=V+V*0.06), and the inclination value variation B is greater than a first inclination threshold ($B_{th1}$=±3°),
wherein in the first encoder threshold $A_{th1}$, V is an average velocity of the cleaning robot.

7. The cleaning robot according to claim 6, wherein the controller decelerates the left driving motor and the right driving motor motors to enable the cleaning robot to escape from the low risk 'lifted state' and provides information suitable for escaping from the 'lifted state'.

8. The cleaning robot according to claim 5, wherein the controller determines that the cleaning robot is in a low risk upper portion 'jammed stated' when at least one of the first and second encoder variations A1 and A2 is less than a first encoder threshold ($A_{th1}$=V+V*0.06), and the inclination value variation B is greater than a first inclination threshold ($B_{th1}$=±3°),
wherein in the first encoder threshold $A_{th1}$, V is an average velocity of the cleaning robot.

9. The cleaning robot according to claim 8, wherein the controller decelerates the left driving motor and the right driving motor to enable the cleaning robot to escape from the low risk upper portion 'jammed state' and provides information suitable for escaping from the upper portion 'jammed state'.

10. The cleaning robot according to claim 4, wherein the controller determines the stuck state of the cleaning robot by detecting the difference between the calculated angle of the cleaning robot and the measured angle of the cleaning robot for a predetermined time period.

11. The cleaning robot according to claim 10, wherein the controller calculates first encoder and the second encoder encoder variations $A1_{t1}$ and $A2_{t1}$ the cleaning robot has moved for a first time period t1 based on the measurements of the first and second encoders, calculates an inclination value variation B the cleaning robot has moved based on the sensor information of the tilt sensor, and determines a degree of risk and type of the stuck state of the cleaning robot by using the calculated first and second encoder variations $A1_{t1}$ and $A2_{t1}$ and the calculated inclination value variation B.

12. The cleaning robot according to claim 11, wherein the controller determines that the cleaning robot is in a low risk 'object-caught state' when at least one of the first and second encoder variations $A1_{t1}$ and $A2_{t1}$ is less than a first encoder threshold ($A_{th1}$=V+V*0.06), and the inclination value variation B is greater than a reference threshold $B_s$ of the upper portion jammed state,
wherein in the first encoder threshold $A_{th1}$, V is an average velocity of the cleaning robot.

13. The cleaning robot according to claim 12, wherein the controller decelerates the left driving motor and the right driving motor to enable the cleaning robot to escape from the low risk "object-caught state' and provides information suitable for escaping from 'object-caught state'.

14. The cleaning robot according to claim 4, wherein the controller determines that the cleaning robot is in a high risk 'lifted state' when at least one of the first and second encoder variations A1 and A2 indicates an idle state, and the inclination value variation B is greater than a second inclination threshold ($B_{th2}$=tan−1 (2r/h)),
wherein in the second inclination threshold $B_{th2}$, r is a radius of the main wheel and h is a ride height of the cleaning robot.

15. The cleaning robot according to claim 14, wherein the controller stops the left driving motor and the right driving motor to enable the cleaning robot to escape from the high risk 'lifted state' and provides information suitable for escaping from the 'lifted state'.

16. The cleaning robot according to claim 5, wherein the controller determines that the cleaning robot is in a high risk upper portion 'jammed stated' when at least one of the first and second encoder variations A1 and A2 is less than a first encoder threshold ($A_{th1}$=V+V*0.06) and greater than a second encoder threshold $A_{th2}$, and the inclination value variation B is greater than a first inclination threshold ($B_{th1}$=±3°),
wherein in the first encoder threshold $A_{th1}$, V is an average velocity of the cleaning robot.

17. The cleaning robot according to claim 16, wherein the controller stops the left driving motor and the right driving motor to enable the cleaning robot to escape from the high risk upper portion 'jammed state' and provides information suitable for escaping from the upper portion 'jammed state'.

18. The cleaning robot according to claim 10, wherein the controller calculates first and second encoder variations $A1_{t2}$ and $A2_{12}$ the cleaning robot has moved for a second time period t2 based on the measurements of the first and second encoders, calculates an inclination value variation B the cleaning robot has moved based on the sensor information of the tilt sensor, and determines a degree of risk and type of the stuck state of the cleaning robot by using the calculated first and second encoder variations $A1_{t2}$ and $A2_{12}$ and the calculated inclination value variation B.

19. The cleaning robot according to claim 18, wherein the controller determines that the cleaning robot is in a high risk 'object-caught state' when at least one of the first and second encoder variations $A1_{t2}$ and $A2_{12}$ is less than a first encoder threshold ($A_{th1}$=V+V*0.06), and the inclination value variation B is greater than a reference threshold $B_s$ of the upper portion jammed state,
wherein in the first encoder threshold $A_{th1}$, V is an average velocity of the cleaning robot.

20. The cleaning robot according to claim 19, wherein the controller stops the left driving motor and the right driving motor to enable the cleaning robot to escape from the high risk "object-caught state' and provides information suitable for escaping from the 'object-caught state'.

* * * * *

UNITED STATES PATENT AND TRADEMARK OFFICE
CERTIFICATE OF CORRECTION

PATENT NO. : 10,362,917 B2
APPLICATION NO. : 15/257204
DATED : July 30, 2019
INVENTOR(S) : Jeong Ki Yoo et al.

It is certified that error appears in the above-identified patent and that said Letters Patent is hereby corrected as shown below:

In the Claims

Column 28, Line 53:
In Claim 4, delete "encoder encoders," and insert -- encoder, --, therefor.

Column 28, Lines 59-60:
In Claim 5, delete "first encoder and the second encoder encoder" and insert -- first and second encoder --, therefor.

Column 28, Line 61:
In Claim 5, delete "first and second encoders," and insert -- first encoder and the second encoder, --, therefor.

Column 29, Line 11:
In Claim 7, delete "motor motors" and insert -- motor --, therefor.

Column 29, Lines 36-37 (approx.):
In Claim 11, delete "first encoder and the second encoder encoder" and insert -- first and second encoder --, therefor.

Column 29, Line 39:
In Claim 11, delete "first and second encoders," and insert -- first encoder and the second encoder, --, therefor.

Column 30, Line 1:
In Claim 13, delete ""object-caught state"" and insert -- 'object-caught state' --, therefor.

Column 30, Line 34 (approx.):
In Claim 18, delete "$A2_{12}$" and insert -- $A2_{t2}$ --, therefor.

Signed and Sealed this
Twenty-ninth Day of October, 2019

Andrei Iancu
*Director of the United States Patent and Trademark Office*

CERTIFICATE OF CORRECTION (continued)
U.S. Pat. No. 10,362,917 B2

Column 30, Line 39 (approx.):
In Claim 18, delete "$A2_{12}$" and insert -- $A2_{t2}$ --, therefor.

Column 30, Line 44 (approx.):
In Claim 19, delete "$A2_{12}$" and insert -- $A2_{t2}$ --, therefor.

Column 30, Line 53 (approx.):
In Claim 20, delete ""object-caught state"" and insert -- 'object-caught state' --, therefor.